(12) United States Patent
Froment et al.

(10) Patent No.: US 9,158,333 B1
(45) Date of Patent: Oct. 13, 2015

(54) RENDERING ON COMPOSITE PORTABLE DEVICES

(75) Inventors: Arnaud Froment, San Jose, CA (US); Manish Lachwani, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/715,943

(22) Filed: Mar. 2, 2010

(51) Int. Cl.
| H04B 1/38 | (2015.01) |
| G09G 5/00 | (2006.01) |
| G06F 1/16 | (2006.01) |
| H04M 1/725 | (2006.01) |

(52) U.S. Cl.
CPC .......... *G06F 1/1615* (2013.01); *H04M 1/72527* (2013.01)

(58) Field of Classification Search
CPC ... G06F 1/1624; G06F 1/1626; G06F 1/1654; H04M 1/0256; H04M 1/72527; H04M 1/0237; H04M 1/0241; H04M 1/0254; H04M 2250/16
USPC .......... 370/270; 455/414.1, 556.1, 556.2, 557, 455/3.06, 418–420; 709/213, 215, 216, 709/227, 231, 232; 715/716–718; 345/1.1–1.3
See application file for complete search history.

(56) References Cited

U.S. PATENT DOCUMENTS

| 6,043,798 | A | 3/2000 | Yamamoto et al. |
| 6,327,152 | B1 * | 12/2001 | Saye .............................. 361/732 |
| 6,340,957 | B1 * | 1/2002 | Adler et al. ..................... 345/1.3 |
| 6,570,546 | B1 * | 5/2003 | Welker et al. .................. 345/1.1 |
| 6,593,902 | B1 * | 7/2003 | Ogino et al. ..................... 345/55 |
| 6,697,251 | B1 * | 2/2004 | Aisenberg ................ 361/679.09 |
| 6,989,800 | B2 * | 1/2006 | McLaughlin .................. 345/1.3 |
| 7,065,575 | B1 | 6/2006 | Machiraju et al. |
| 7,068,294 | B2 * | 6/2006 | Kidney et al. ................. 715/700 |
| 7,171,692 | B1 | 1/2007 | DeMello et al. |
| 7,239,898 | B2 * | 7/2007 | Lenchik et al. ............ 455/575.1 |
| 7,379,975 | B2 * | 5/2008 | Hussmann ..................... 709/217 |
| 7,409,231 | B2 * | 8/2008 | Oba et al. ...................... 455/566 |
| 7,496,630 | B2 | 2/2009 | Arellano et al. |
| 7,564,425 | B2 * | 7/2009 | Martinez et al. ............... 345/1.3 |
| 7,748,634 | B1 | 7/2010 | Zehr et al. |
| 7,782,274 | B2 * | 8/2010 | Manning ........................ 345/1.3 |
| 7,911,409 | B1 | 3/2011 | Chatterjee et al. |
| 7,941,197 | B2 * | 5/2011 | Jain et al. ................... 455/575.8 |
| 2002/0091877 | A1 * | 7/2002 | Karidis ............................. 710/1 |
| 2002/0129097 | A1 | 9/2002 | Jia |
| 2003/0015632 | A1 * | 1/2003 | Dunn et al. ................. 248/122.1 |
| 2003/0041206 | A1 | 2/2003 | Dickie |

(Continued)

OTHER PUBLICATIONS

Office Action for U.S. Appl. No. 12/493,864, mailed on Oct. 6, 2011, Kim, "Multi-Device Interoperability", 26 pages.

(Continued)

*Primary Examiner* — San Htun
*Assistant Examiner* — Erica Navar
(74) *Attorney, Agent, or Firm* — Lee & Hayes, PLLC

(57) ABSTRACT

Constituent electronic devices such as eBook reader devices may be combined to form a composite device. Resources such as power, data, processing capabilities, network interfaces, displays, and so forth may be shared between the constituent devices. Resources may also be allocated and transferred to increase operational time of depleted individual electronic devices. Content may be presented across the constituent devices of the composite device. A relative spatial arrangement of the composite devices may be determined to facilitate the presentation.

25 Claims, 18 Drawing Sheets

(56) References Cited

U.S. PATENT DOCUMENTS

| | | |
|---|---|---|
| 2003/0055867 A1 | 3/2003 | King |
| 2004/0008155 A1* | 1/2004 | Cok .................. 345/1.3 |
| 2004/0080528 A1 | 4/2004 | Rand et al. |
| 2004/0116141 A1 | 6/2004 | Loven et al. |
| 2004/0196210 A1 | 10/2004 | Nagatsuka et al. |
| 2004/0223485 A1 | 11/2004 | Arellano et al. |
| 2005/0093768 A1* | 5/2005 | Devos et al. .......... 345/1.3 |
| 2005/0138576 A1 | 6/2005 | Baumert et al. |
| 2005/0168399 A1* | 8/2005 | Palmquist .............. 345/1.1 |
| 2005/0219223 A1* | 10/2005 | Kotzin et al. ............. 345/173 |
| 2005/0275602 A1 | 12/2005 | Murgolo et al. |
| 2006/0087993 A1 | 4/2006 | Sengupta et al. |
| 2006/0146765 A1* | 7/2006 | Van De Sluis et al. ...... 370/338 |
| 2007/0064147 A1* | 3/2007 | Kondo et al. ............ 348/383 |
| 2007/0182663 A1* | 8/2007 | Biech ................... 345/1.1 |
| 2007/0266119 A1 | 11/2007 | Ohly |
| 2007/0279315 A1* | 12/2007 | Laves et al. ............ 345/1.1 |
| 2008/0005233 A1 | 1/2008 | Cai et al. |
| 2008/0005656 A1 | 1/2008 | Pang et al. |
| 2008/0068291 A1 | 3/2008 | Yuan et al. |
| 2008/0177822 A1 | 7/2008 | Yoneda |
| 2008/0259057 A1* | 10/2008 | Brons ................ 345/184 |
| 2008/0320501 A1 | 12/2008 | Li et al. |
| 2009/0101716 A1 | 4/2009 | Mani et al. |
| 2009/0149218 A1* | 6/2009 | Chen et al. ............... 455/557 |
| 2009/0160731 A1* | 6/2009 | Schuler et al. .......... 345/1.1 |
| 2009/0221303 A1 | 9/2009 | Soliman |
| 2009/0309846 A1 | 12/2009 | Trachtenberg et al. |
| 2010/0013762 A1* | 1/2010 | Zontrop et al. .......... 345/156 |
| 2010/0082784 A1 | 4/2010 | Rosenblatt et al. |
| 2010/0115096 A1 | 5/2010 | Eruchimovitch et al. |
| 2010/0144283 A1* | 6/2010 | Curcio et al. ............ 455/66.1 |
| 2010/0156913 A1 | 6/2010 | Ortega et al. |
| 2010/0278345 A1* | 11/2010 | Alsina et al. ............ 380/283 |
| 2011/0102314 A1* | 5/2011 | Roux ................... 345/156 |
| 2011/0239101 A1 | 9/2011 | Rivers-Moore et al. |

OTHER PUBLICATIONS

Final Office Action for U.S. Appl. No. 12/493,864, mailed on Apr. 13, 2012, John T Kim, "Multi-Device Interoperability", 32 pages.
Office action for U.S. Appl. No. 12/715,938, mailed on Apr. 24, 2013, Froment et al., "Mixed Use Multi-Device Interoperability," 12 pages.
Office action for U.S. Appl. No. 12/715,981, mailed on Mar. 26, 2013, Froment et al., "Composite Portable Devices", 23 pages.
Final Office Action for U.S. Appl. No. 12/715,938, mailed on Oct. 24, 2013, Froment, "Mixed Use Multi-Device Interoperability," 11 pages.
Final Office Action for U.S. Appl. No. 12/715,981, mailed on Sep. 25, 2013, Froment, "Composite Portable Devices," 20 pages.
Office action for U.S. Appl. No. 12/493,864, mailed on Mar. 14, 2014, Kim, "Multi-Device Interoperability," 21 pages.
Office action for U.S. Appl. No. 12/715,938 mailed on Oct. 19, 2012, Froment et al., "Mixed Use Multi-Device Interoperability," 13 pages.
Office Action for U.S. Appl. No. 12/715,981, mailed on Jan. 28, 2015, Arnaud Froment, "Composite Portable Devices", 21 pages.
Office Action for U.S. Appl. No. 12/493,864, mailed on Jan. 30, 2015, John T. Kim, "Multi-Device Interoperability", 15 pages.
Office action for U.S. Appl. No. 12/493,864, mailed on Oct. 3, 2014, Kim et al., "Multi-Device Interoperability", 22 pages.
Yurek, "Dot Color—The Difference between 'color gamut' and 'bit depth'", at http: 1/dot-color .com/2011/10/08/the-difference-be\\Mlen-col or-gamut-and-bi !-depth/, 2011, 5 pages.

* cited by examiner

RENDERING ON COMPOSITE PORTABLE DEVICES

BACKGROUND

Electronic devices such as electronic book readers ("eBook reader devices"), cellular telephones, portable media players, laptops, tablet computers, netbooks, personal digital assistants and the like, provide a variety of functions to users. Due to differences in construction, patterns of use, and so forth, each device may have different resources available such as network connectivity, battery power, computational capacity, memory capacity, and so forth.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Electronic devices such as electronic book reader devices ("eBook reader devices"), cellular telephones, portable media players, laptops, tablet computers, netbooks, personal digital assistants and the like, provide a variety of functions to users. Due to differences in construction, patterns of use, and so forth, each device may have different available resources such as network connectivity, battery power, computational capacity, memory capacity, and so forth.

This disclosure describes, in part, devices and techniques for forming a composite device from a plurality of constituent devices. Resources may be shared amongst the constituent devices of the composite device to extend operational time or capabilities, as well as to provide enhanced capabilities. Resources include electrical power, network interfaces, memory, processing capability, display devices and other outputs, and so forth.

Once the composite device is established, content stored on one constituent device may be presented at one or more of the constituent devices. For example, pages from an eBook may be presented across several eBook reader devices. In some implementations, a single constituent device provides the content and pre-renders the content prior to transmission to the other constituent devices for presentation.

Presentation of the content across the constituent devices that form the composite device may also take into account a relative spatial arrangement of the constituent devices. For example, a row of constituent devices laid upon a table may display content of an eBook relative to the sequence. Thus, a constituent device at the leftmost of the row shows a first page, the second constituent device from the left shows the second page, and so forth. While the techniques described herein are described with reference to eBook reader devices, these techniques similarly apply to other electronic devices, including portable handheld electronic devices, such as laptop computers, mobile phones, netbooks, personal media players ("PMPs"), etc.

Illustrative EBook Reader Device

Figure 1:
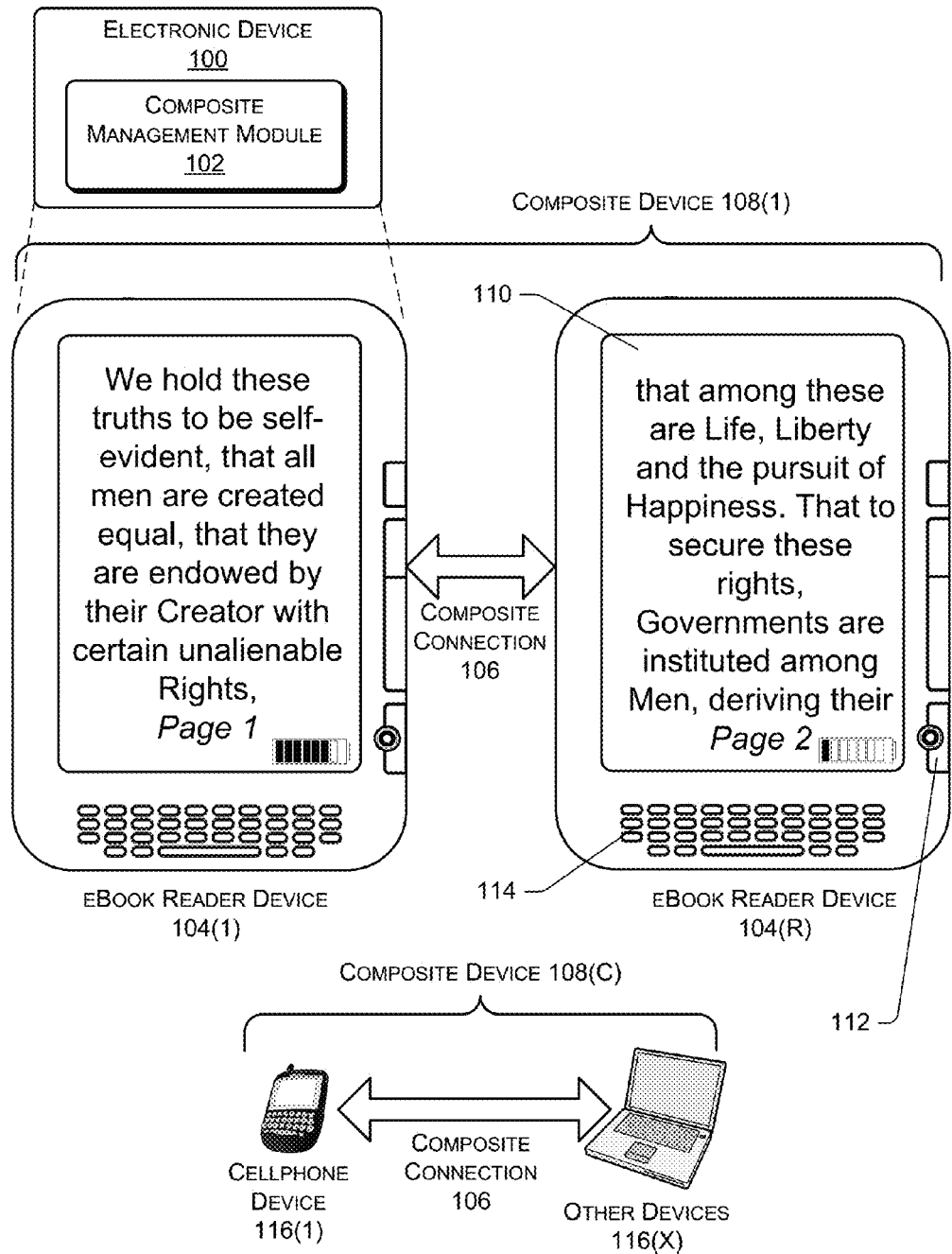
FIG. 1 is an illustrative pair of eBook reader devices configured to form a composite device.

FIG. 1 is an illustrative electronic device 100 configured to participate in a composite device by way of a composite management module 102. A composite device comprises a plurality of constituent devices participating as a single, integrated device that shares resources of the constituent devices. Several devices are shown in this illustration that may utilize the composite management module 102. For example, eBook reader devices 104(1), . . . 104(R) are shown embodied as handheld, dedicated eBook reader devices. As used in this application, letters within parenthesis such as "(D)" indicate an integer number greater than zero.

A composite connection 106 may be established between the devices, thus facilitating the sharing of resources between constituent devices 104(1)-104(R). The composite connection may be established via a Bluetooth or other wireless connection, a wired connection, and so forth. This composite connection 106 may be provided by a composite connection interface discussed in more detail below with regards to FIG. 2.

Once connected via the composite connection 106, constituent devices 104(1)-104(R) form a composite device 108(1). The composite management modules 102 within the constituent devices manage resource allocation amongst the devices in the composite device 108(1).

The eBook reader device 104 may have a display 110 to present content in a human-readable format to a user. The display 110 may be an electrophoretic display, cholesteric display, liquid crystal display, light emitting diode display, and so forth. In some implementations, one or more displays 110 may be present. These displays may be of the same or different types. For example, one display may be an electrophoretic display while another may be a liquid crystal display.

The content presented on the display 110 may take the form of electronic books or "eBooks." For example, the display 110 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 110 may further include touch screen capabilities that allow user input through contact or gesturing relative to the display. For convenience only, the display 110 is shown in a generally rectangular configuration. However, it is understood that the display 110 may be implemented in any shape, and may have any ratio of height to width. Also, for stylistic or design purposes, the display 110 may be curved or otherwise non-linearly shaped. Furthermore display 110 may be flexible and configured to fold or roll.

The eBook reader device 104 may also incorporate one or more actuatable controls 112, and a keypad 114 for user input. The one or more actuatable controls 112 may have dedicated or assigned operations. For instance, the actuatable controls 112 may include page turning buttons, a joystick, navigational keys, a power on/off button, selection keys, joystick, touchpad, and so on.

While a composite device 108(1) comprising a plurality of eBook reader devices 104(1)-(R) is shown, it is understood that other electronic devices may form composite devices. For example, cellular telephone 116(1) and other devices 116(X) such as portable media players, desktop computers, laptops, tablet computers, netbooks, personal digital assistants, servers, medical devices, and the like may be coupled via a composite connection 106 to form composite device 108(C).

Figure 2:
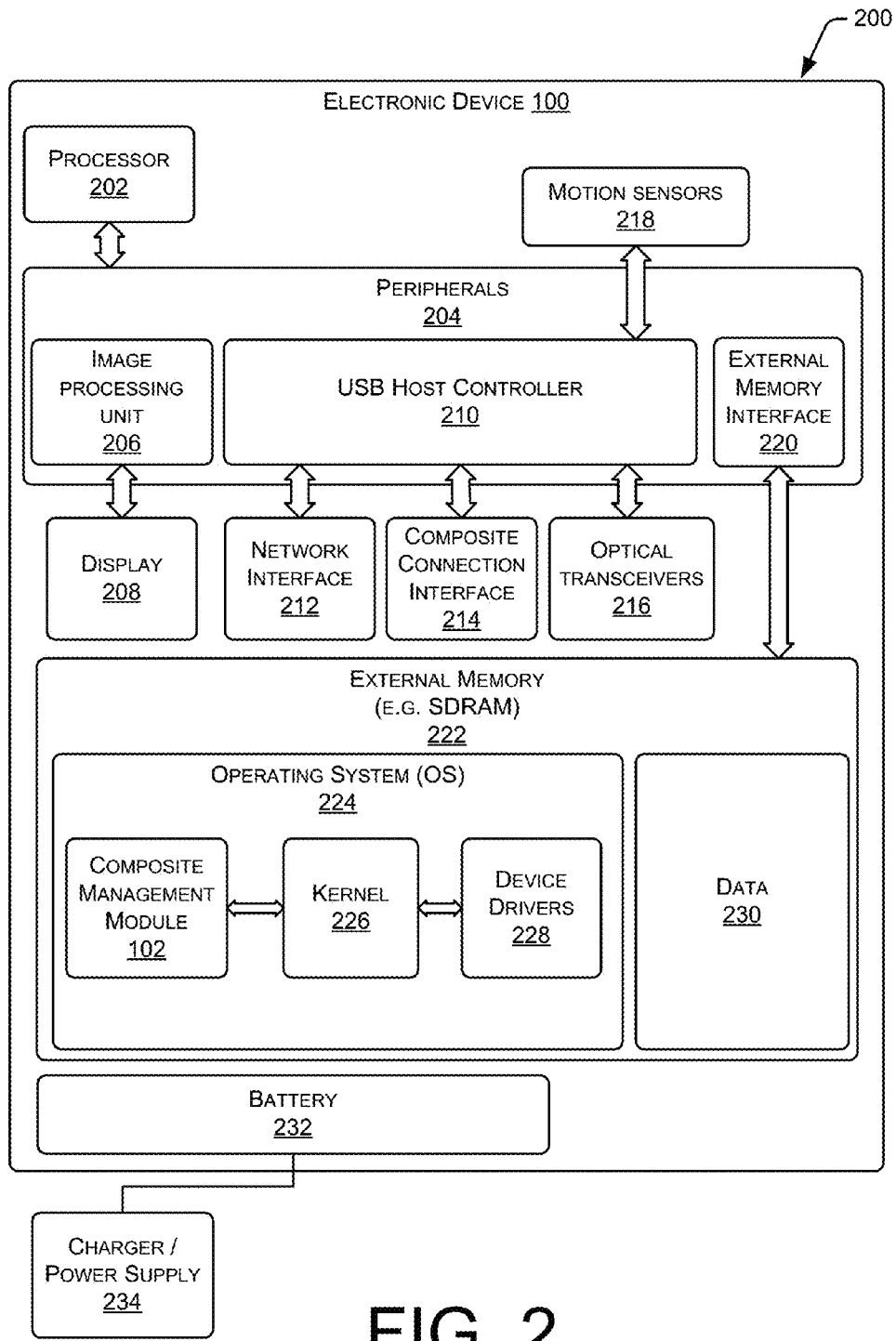
FIG. 2 is an illustrative schematic of an electronic device configured to form a composite device when connected with at least one other electronic device.

FIG. 2 illustrates selected functional components 200 that might be implemented in the electronic device 100. In a very basic configuration, the device 100 includes components such a processor 202 and one or more peripherals 204. Each processor 202 may itself comprise one or more processors.

Peripherals 204 may be coupled to the processor 202. An image processing unit 206 is shown coupled to one or more displays 208. For example, this display 208 may be display 110 on eBook reader device 104 described above. In some implementations, multiple displays may be present and coupled to the image processing unit 206. In some implementations, one or more image processing units 206 may couple to the multiple displays.

Electronic device 100 may have a keypad which may be the same, for example, as the keypad 114 on eBook reader device 104 described above. A hard drive that may use magnetic or optical memory or solid state storage may be present to store information, such as eBooks.

FIG. 2 further illustrates that components 200 may include a USB host controller 210. USB host controller 210 manages communications between devices attached to a universal serial bus ("USB") and the processor 202 and other peripherals. The USB host controller 210 may be coupled to a network interface 212 via the universal serial bus. Network interface 212 may allow for connection to wired or wireless local or wide area networks. For example, network interface 212 may comprise a wireless wide area networking ("WWAN") interface.

A composite connection interface 214 may also be coupled to USB host controller 210 via the universal serial bus. Composite connection interface 214 may include wired connectivity, wireless connectivity, or both. Composite connection interface 214 may implement a personal area network between the electronic device 100 and other electronic devices 100 that are proximate to one another. In some implementations, an electronic device 100 is determined to be proximate to another electronic device 100 when a connection via the personal area network is available. The personal area network may utilize a Bluetooth™ wireless network, wired USB connection, Firewire, Infrared Data Association ("IrDA") connection, and so forth.

Optical transceivers 216 may also be connected to the USB host controller 210 via the universal serial bus. These optical transceivers 216 may be configured to transmit and receive optical signals, such as infrared or visible light. These optical transceivers 216 may be used to determine the relative spatial arrangement of the constituent devices in a composite device 108. This determination is discussed in more detail below with respect to FIG. 10. In some implementations, these optical transceivers 216 may be omitted and an Infrared Data Association ("IrDA") or wireless transceiver may be used to determine spatial location relative to other electronic devices 100. In such implementations, the IrDA may also be used to establish the personal area network.

One or more motion sensors 218 may also be connected to the USB host controller 210 via the universal serial bus. These motion sensors may include linear accelerometers, rotational accelerometers, gyroscopes, laser gyroscopes, quartz rate sensors, pendular accelerometers, and so forth. These motion sensing devices provide information about their relative movement in space. When coupled to the electronic device 100, motion of the electronic device 100 in space may be determined. These motions may be linear, angular, or a combination of the two. In some implementations, data from the motion sensors 218 may be used to determine a relative spatial arrangement by tracking movement of the devices from a common origin point. This determination of relative spatial arrangement by tracking movement is described below in more depth with regards to FIGS. 11A-11B.

An external memory interface ("EMI") 220 is also shown coupled to external memory 222. The EMI 220 manages access to data stored in external memory 222. The external memory 222 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer readable storage media.

External memory 222 may be used to store any number of functional components that are executable on processor 202, as well as data including content items such as eBooks. Thus, memory 222 may store an operating system 224 comprising a kernel 226 operatively coupled to one or more device drivers 228. Device drivers 228 are also operatively coupled to peripherals 204. Kernel 226 may also be coupled to composite management module 102, as introduced with respect to FIG. 1. In some implementations, composite management module 102 may be internal to kernel 226.

External memory 222 may also store data 230, which may comprise content objects for consumption on electronic device 100, executable programs, databases, user settings, configuration files, device status, and so forth. Furthermore, electronic device 100 may include one or more other, non-illustrated peripherals, such as a firewire bus, camera, global positioning system, PC Card component, and so forth.

A battery 232 may present to provide electrical power to components of the electronic device 100 when disconnected from an external power supply. Battery 232 may be interrogated by a power management module to measure or determine battery parameters including power remaining, charge cycle count, estimated operational life remaining, and so forth. These parameters may include capacity such as milli-amp-hours ("mAH"), percentage of total, and so forth.

Electronic device 100 may couple to a battery charger/power supply 234. This charger/power supply 234 may be internal or external to the electronic device 100. This charger/power supply 234 is configured to provide operational power for electronic device 100, configured to charge battery 232, or both.

Charger/power supply 234 may be coupled to electronic device 100 via several mechanisms. For illustration, and not by way of limitation, the following mechanisms are discussed. In some implementations, direct coupling using an electrically conductive material provides transfer of power between charger/power supply 234 and device 100. In another implementation, optical coupling may also provide for transfer of power. Optical coupling includes a light source on charger/power supply 234 emitting photons and a photovoltaic cell on the electronic device 100 converting at least a portion of those emitted photons into electrical energy. In another implementation, inductive coupling may be used. Inductive coupling utilizes an electromagnetic field to transfer power. Other implementations may use capacitive coupling, resonant power transfer, non-radiative energy transfer, and so forth.

In some implementations, constituent devices within composite device 108 may be coupled to one another using the above mechanisms to transfer power between the constituent devices. Furthermore, various coupling modes may be combined. For example, one constituent electronic device 100 may be directly coupled to a charger/power supply 234 and also provide power inductively to another electronic device 100.

Couplings, such as that between kernel 228 and device driver 230, are shown for emphasis. There are couplings between many of the components illustrated in FIG. 2, but graphical arrows are omitted for clarity of illustration.

Figure 3:
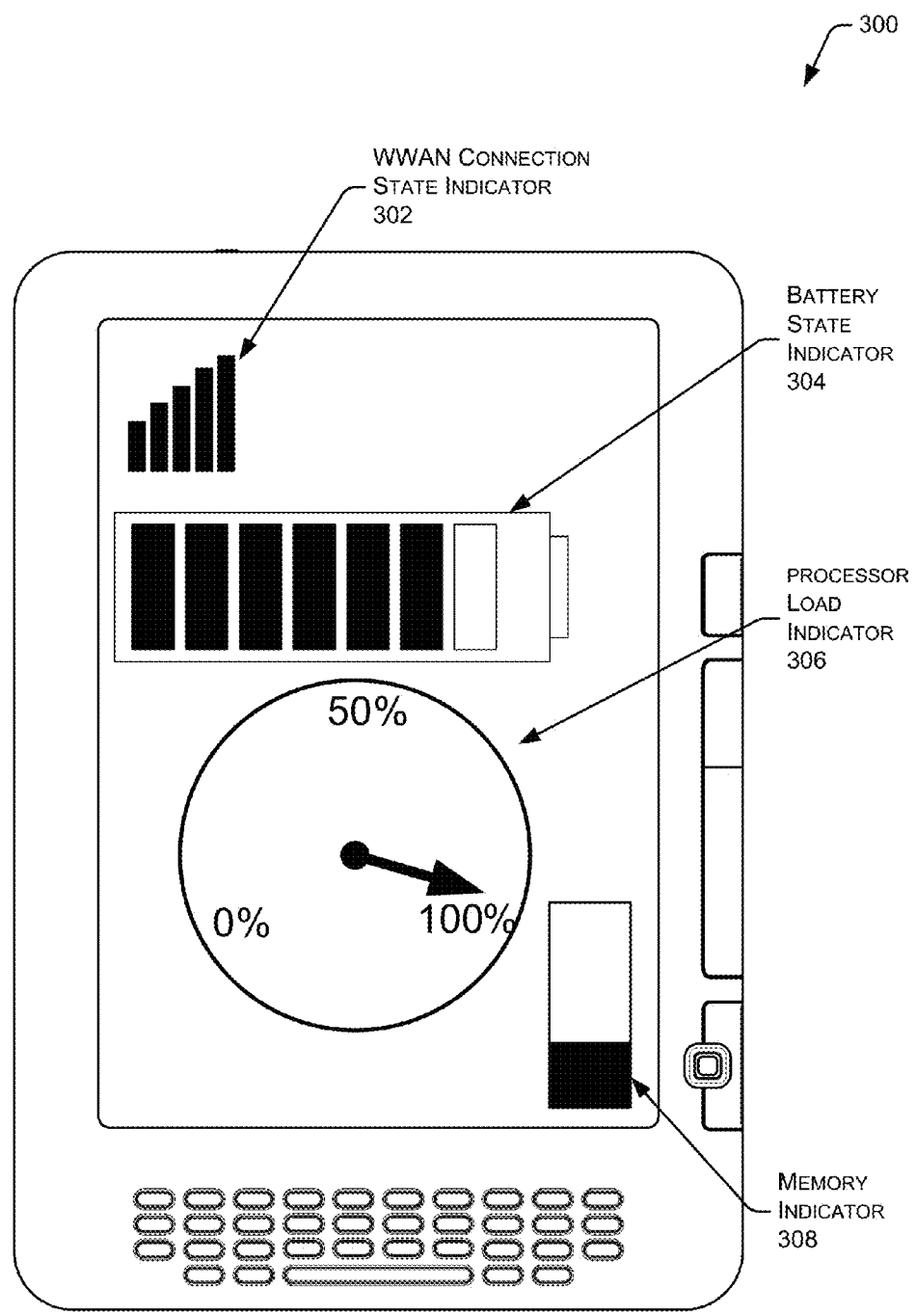
FIG. 3 is an illustration of an eBook reader device displaying device status indicators.

FIG. 3 is an illustration of an eBook reader device displaying device status icons that may display a status of one or more components of the device. These icons may include a network connectivity state indicator, such as a wireless wide area networking ("WWAN") state indicator 302. As shown here, the WWAN interface (such as 212) is active and has a full strength signal. In other implementations the indicator may be driven by one or more other metrics such as connection bandwidth.

A battery state indicator 304 indicates a status or power level of the battery. Here, the battery is about 85% fully charged. As described above, the battery state indicator may derive its information from battery 232, the power management module, charger/power supply 234, or a combination thereof.

Processor load of the device may also be indicated, such as shown by a status icon 306. Processor load may indicate a quantity of computational capacity in use on electronic device 100. For example, should electronic device 100 be involved in a processor intensive task such as building an index for an eBook, computational capacity in use may be close to 100%, as shown. In contrast, when the processor 202 is largely idle, the processor load is correspondingly close to or at zero.

A memory status icon 308 indicates an amount of memory available on or to the device. Available memory may be either volatile or non-volatile memory available for data storage and, further, the memory may be local (e.g., integral with the device) or remote (e.g., on a server accessible by the device over a network). For example, available memory status icon 308 may indicate the amount of memory available in a non-volatile flash memory device attached to EMI 222.

Figure 4:
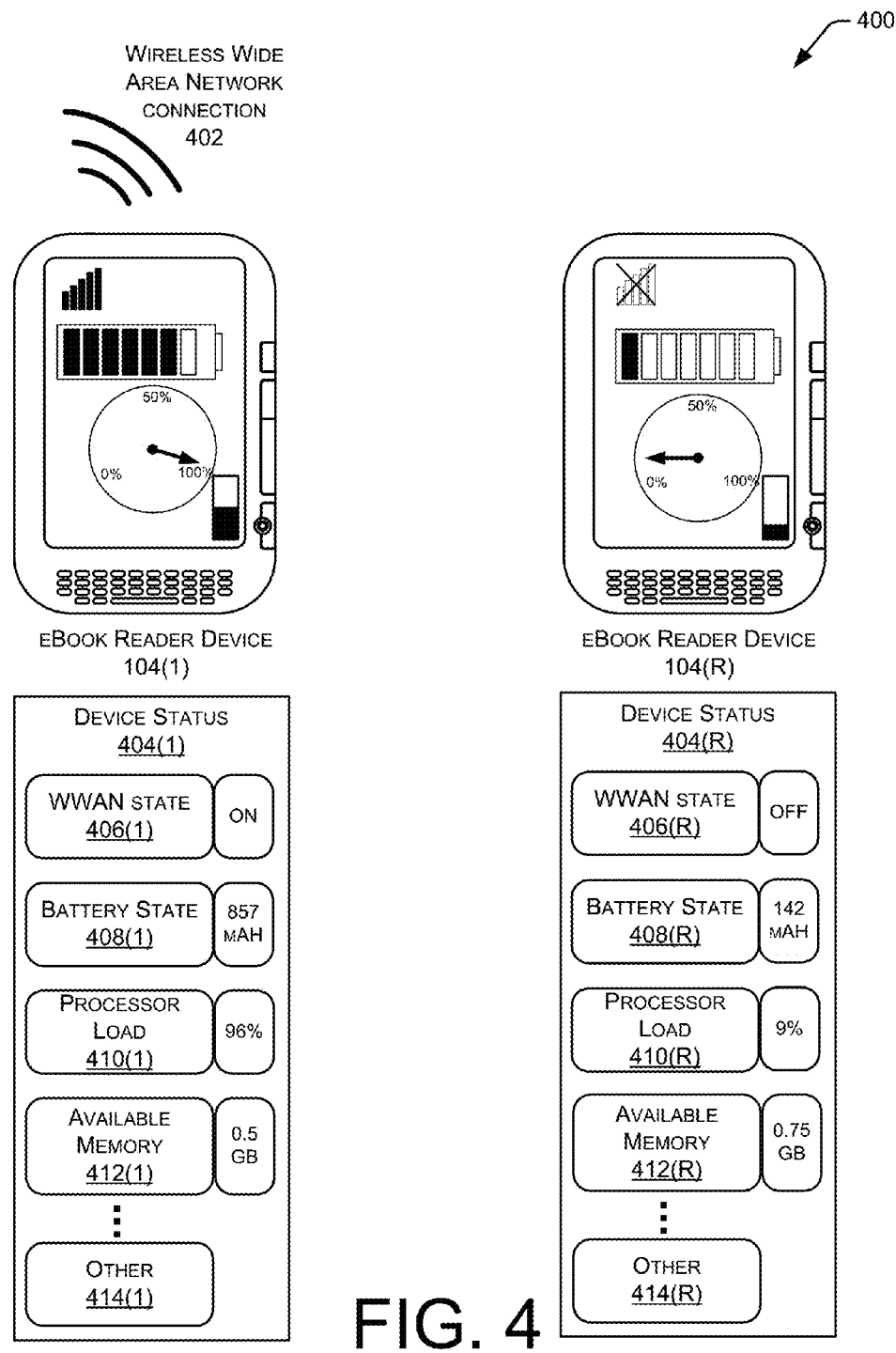
FIG. 4 is an illustration of example device status information on a pair of electronic devices.

FIG. 4 is an illustration of example device status information 400 on a pair of electronic devices. In this illustration a first eBook reader device 104(1) has an active WWAN network connection 402. Device status 404(1) may include information about several of the resources available on the first eBook reader device 104(1), as well as their state. WWAN state 406(1) is shown as "on," as a result of the WWAN network connection 402. When the WWAN network connection is off, disabled, or placed into a low power mode, the state would be updated accordingly. Battery state 408(1) indicates an available battery capacity of 857 milliamperes (mA). Processor load 410(1) indicates the processor is heavily loaded at 96% utilization. Available memory is 0.5 gigabytes (GB). Other state information 414(1) may be available, such as an indication as to whether an output device, such as a display device or audio device, is currently in use, display device parameters, and so forth.

In contrast, eBook reader device 104(R) shows a different device status 404(R). On this eBook reader device 104(R) the WWAN state 406(R) indicates the WWAN network connection is off Battery state 408(R) indicates a battery capacity of 142 mAH, indicating the device is more deeply discharged. Processor load 410(R) is low at only 9% utilization of the computational capacity of the processor. Finally, available memory 412(R) is 0.75 GB.

Figure 5A:
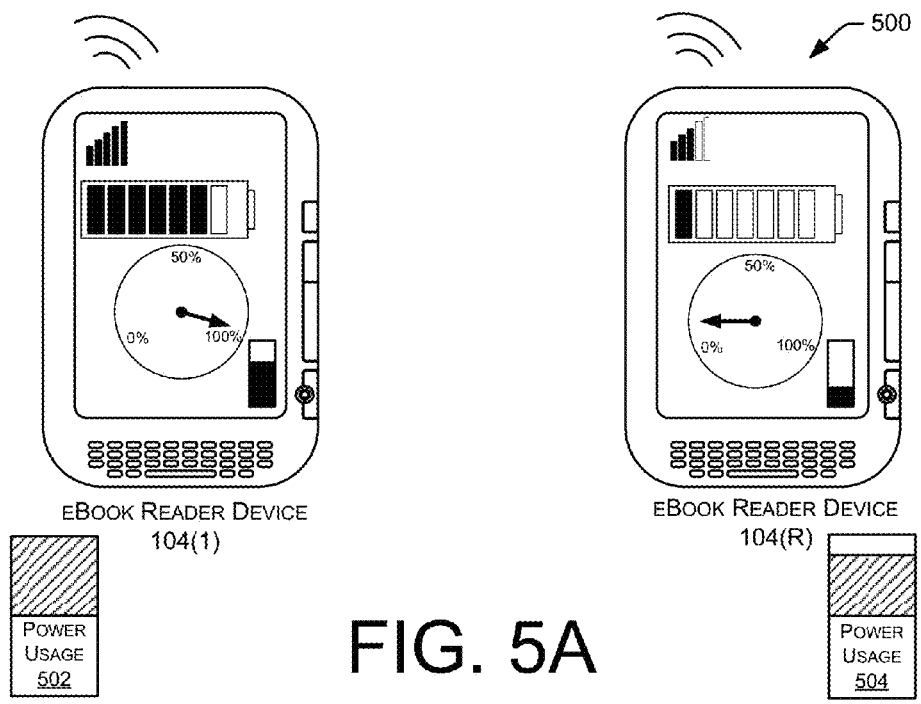
FIGS. 5A, 5B, and 5C illustrate resource sharing between constituent devices which together form a composite device.
Figure 5B:
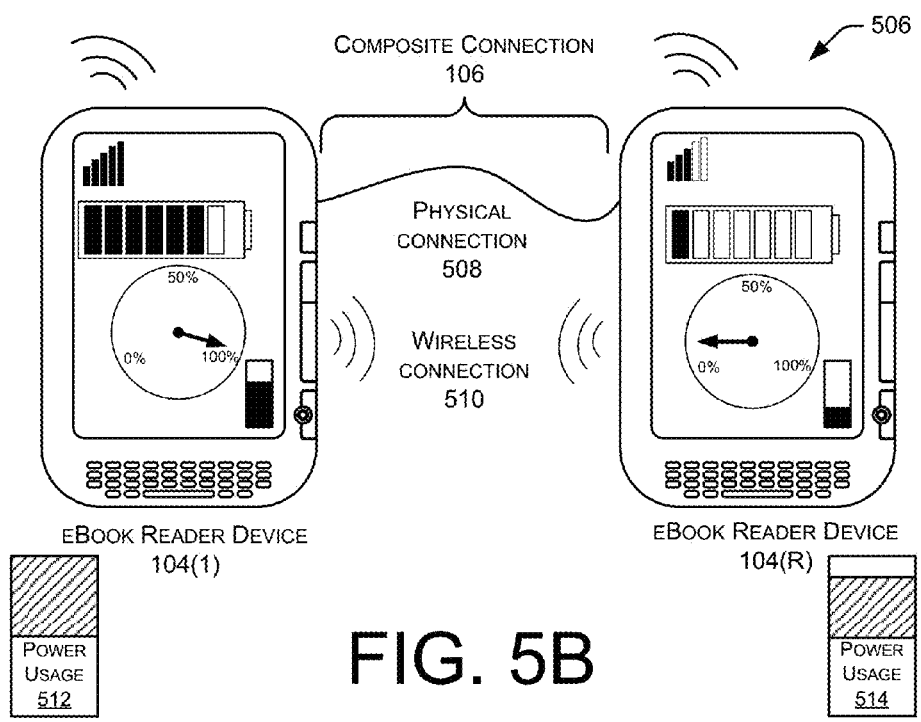
Figure 5C:
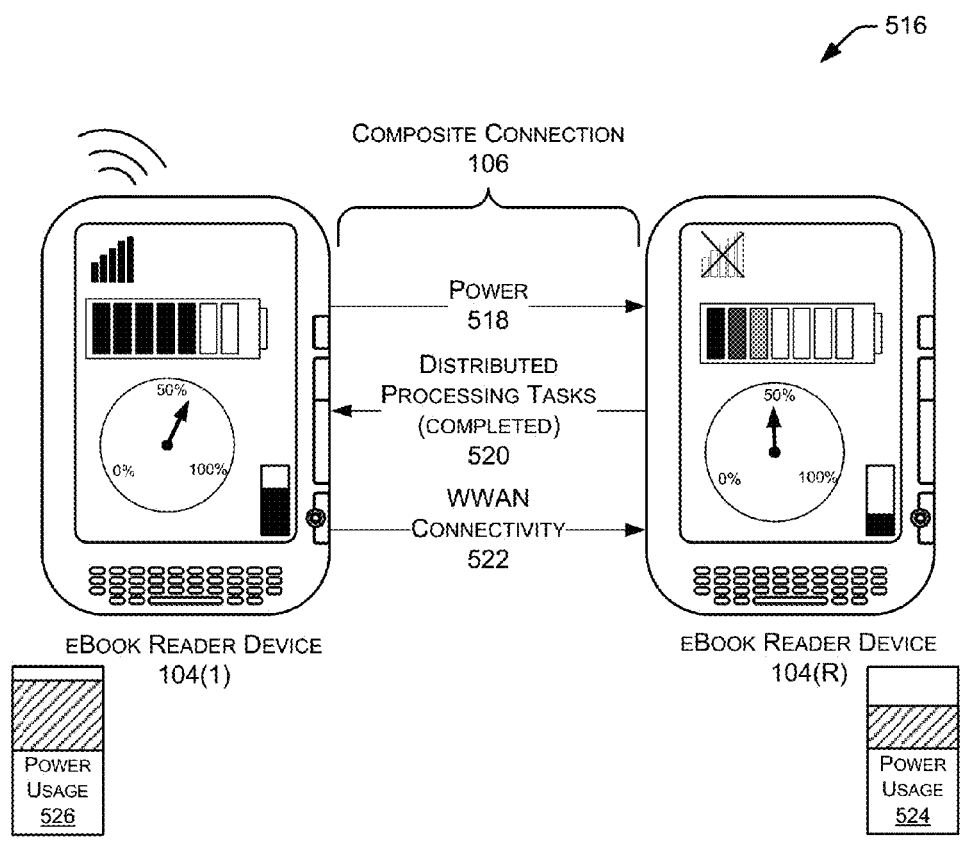

FIGS. 5A, 5B, and 5C illustrate resource sharing between individual devices which together form a composite device. FIG. 5A at 500 shows a pair of eBook reader devices 104(1) and 104(R). A graph 502 shows eBook reader device 104(1) having a high power usage. Given the use of the WWAN network interface, and processor load, this is to be expected. Meanwhile, eBook reader device 104(R) indicates a poorer, but still operative WWAN network connection, depleted battery condition, and low processor load. At 504, power usage for eBook reader device 104(R) is somewhat less than eBook reader device 104(1), but still significant.

FIG. 5B shows the eBook reader devices 104(1) and (R), each a constituent device, coupled together via a composite connection 106 to form a composite device 506. A composite device having two constituent devices is shown herein for clarity in illustration, and not by way of limitation. Thus, a composite device may include three, four, or more constituent devices.

As described above, composite connection 106 may be a physical connection 508, such as the direct coupling described above, or a wireless connection 510. In either instance, the physical or wireless connection 510 may allow for a transmission of data, power, or both. Furthermore, a combination of wired connection 508 and wireless connection 510 may be used. For example, electrical power may be delivered via a physical connection 508 while data is transferred via a wireless connection 510.

In FIG. 5B, resource allocation and sharing has not yet begun. Thus, eBook reader device 104(1) shows at 512 the same full power usage shown above, while eBook reader device 104(R) shows at 514 the same significant power consumption.

FIG. 5C shows the constituent devices of a composite device after resource allocation and sharing 516. The eBook reader device 104(1) which has a surplus of power in the battery provides power 518 to eBook reader device 104(R). Thus the eBook reader device 104(R) may receive power for operation, battery charging, or both. In some implementations, transfer of power may be subject to pre-determined thresholds to prevent draining power completely from one device to another, unless otherwise a user instructs otherwise.

The available computational computing capacity of eBook reader device 104(R) has been exploited by sending tasks from eBook reader device 104(1) to eBook reader device 104(R) for execution. Upon completion, the eBook reader device 104(R) may return the results of those distributed processing tasks to eBook reader device 104(1) as shown at 520.

In some implementations where the processing loads are minimal, resource allocation may result in one or more of the processors in the composite device entering low power or reduced capability modes. For example, as described below with regards to FIGS. 13A and 13-B, a first constituent device may provide preprocessed content to a second constituent device. In such a situation, the demands on the processor in the second constituent device may be minimal, due to the preprocessing. Thus, the second constituent device may drop to a lower power mode, reduced clock speed, and so forth.

Given the redundancy of having two operable WWAN connections, and given the poorer quality of the WWAN connection on the eBook reader device 104(R) compared to the eBook reader device 104(1), the WWAN network interface on eBook reader device 104(R) has been disabled. The eBook reader device 104(1) provides WWAN connectivity to the eBook reader device 104(R) via the composite connection 106.

Individual constituent devices may experience reductions in power consumption as a result of participating in the composite device. For example, by shutting down the redundant WWAN network interface, power consumption on the eBook reader device 104(R) is reduced as shown by graph 524. As shown by graph 526, power usage of the eBook reader device 104(1) has also dropped slightly due to the reduced processor usage resulting from the distribution of some processing tasks to the eBook reader device 104(R).

Figure 6:
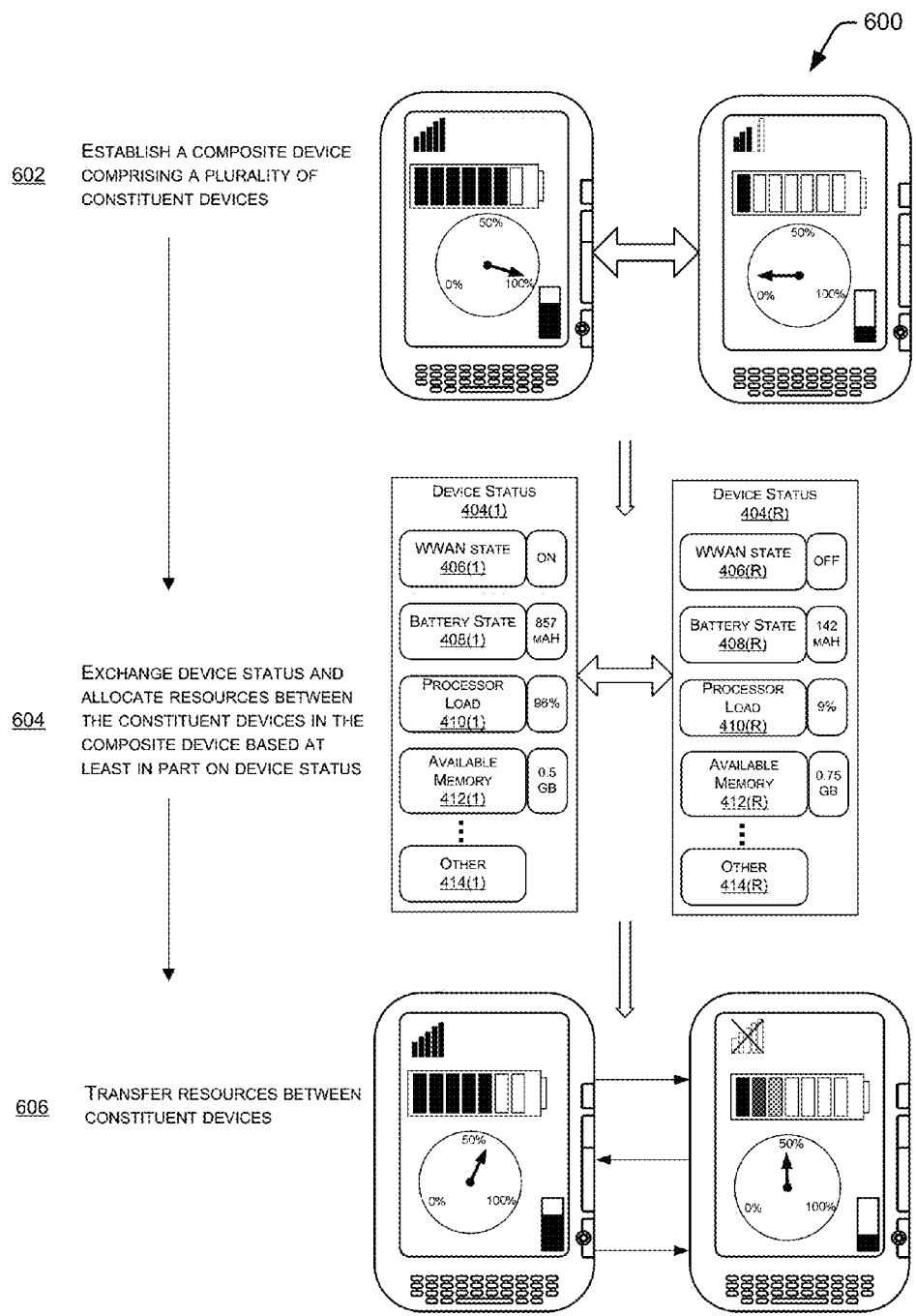
FIG. 6 is an illustrative process of sharing resources amongst constituent devices in a composite device.

FIG. 6 is an illustrative process of sharing resources amongst constituent devices in a composite device. Operation 602 shows establishing a composite device that includes a plurality of constituent devices coupled together via physical and/or a wireless connection. Establishment of the composite device may be user initiated or automatic. As shown here, two devices have established a composite connection and, hence, have formed a composite device.

Operation 604 shows the exchange of device status between the constituent devices. Once device status has been exchanged, resource allocation takes place. In some implementations a single constituent device may act as a master and receive the device status information. The master may then allocate resources at least in part as a result of the received device status information. In other implementations, these functions may be distributed across the constituent devices, such as in a peer-to-peer arrangement. In some implementations, resources may be manually allocated or deallocated. For example, processor sharing on a particular constituent device may be disallowed by a user of that device. In other implementations, resources may be automatically allocated or deallocated based on the resources of the constituent devices or the like.

Operation 606 shows the transfer of resources between constituent devices according to the resource allocation. In this example, power, processing tasks, and WWAN capability is shared between the constituent devices. Thus, the composite device results in capabilities which may be difficult or impossible for individual constituent devices to provide. For example, a constituent device with a low battery, active WWAN networking interface, and so forth may not be able to complete a task such as indexing a large eBook before power on the device is exhausted. Furthermore, even if the power were available, a single constituent device may require an unacceptably long time to complete the indexing. However, by forming a composite device where resources such as power, processing capability, and networking interfaces are shared, the indexing task become possible by sharing power and computational resources.

Illustrative Process for Buffering Information in Internal Memory

Figure 7:
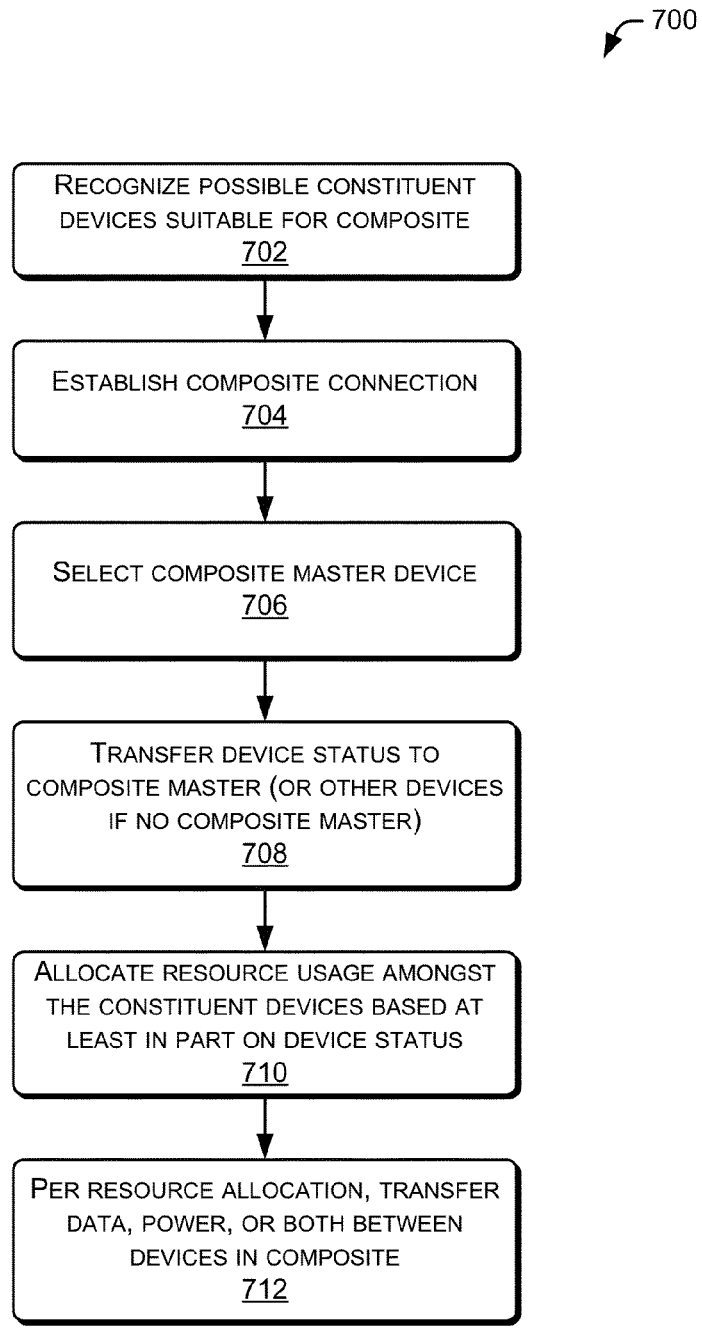
FIG. 7 is an illustrative flow diagram of a process for forming a composite device and sharing resources therein.
Figure 15:
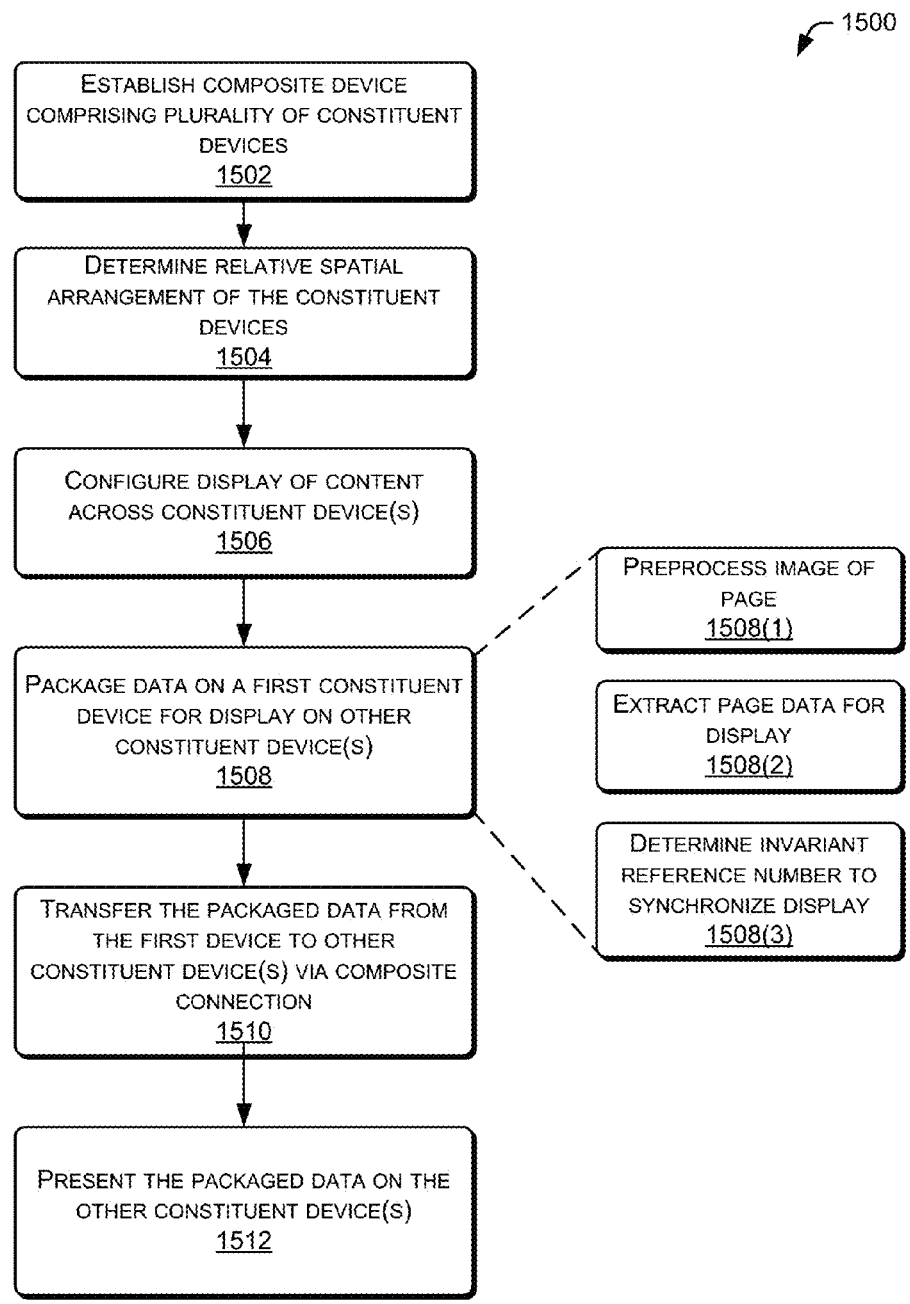
FIG. 15 is an illustrative flow diagram of a process of configuring display resources across a composite device.
Figure 16:
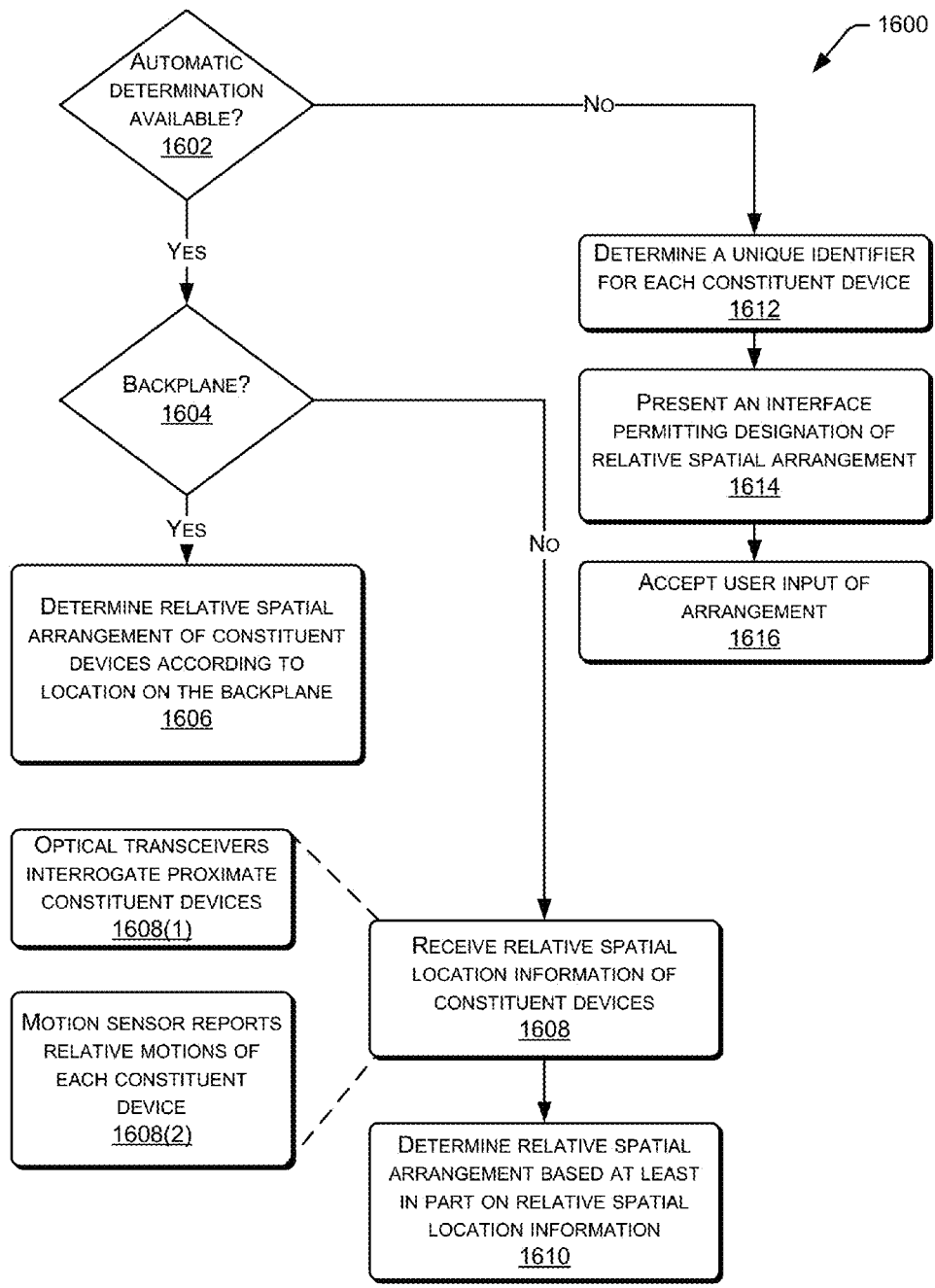
FIG. 16 is an illustrative flow diagram of a process of determining a spatial arrangement of constituent devices that together form a composite device.

FIGS. 7, 15, and 16 illustrate example processes 700, 1500 and 1600 that may be implemented by the architecture of FIGS. 1-6 or by other architectures. These processes are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 7 is an illustrative flow diagram of a process 700 for forming a composite device and sharing resources therein. Unless otherwise specified, the following acts may be performed by the composite management module 102 on one or multiple different constituent devices.

At 702, the composite management module 102 recognizes possible constituent devices suitable for forming a composite device. Devices may be considered suitable due to one or more factors. These factors include proximity, connectivity, security considerations, previously pre-defined user preferences, and so forth. Recognition of possible constituent devices may be initiated automatically, by a user, or both. Automatic initiation may occur based on a variety of factors such as location, time, when the individual resources of a possible constituent device are insufficient for a task, and so forth.

At 704, a composite connection 106 between suitable constituent devices is established. This composite connection may be wired, wireless, or both. For example, a cable, backplane, Bluetooth, 802.11n, or an IrDA connection may be used to establish the composite connection.

In some implementations, one of the constituent devices may be designated to accept device status information and allocate resources. At 706, one of the constituent devices is designated as a composite master device. Several factors may be used to designate the composite master. These factors may include model number, firmware version, operating system version, random selection, user selection, and so forth. For instance, a device that first requests to form the composite device may be assigned the master role. Or, the device having the greatest capabilities of one or more resources (e.g., the highest charged battery) may be assigned the master role.

However, in some implementations a peer-to-peer arrangement may be used, thus there would be no defined composite master device. Instead, the functions are distributed across several constituent devices.

At 708, device status information is transferred to a composite master device or the other constituent devices when no composite master is used. As described above with regards to FIG. 4, this device status information may include WWAN state, battery state, processor load, available memory, and so forth. As a result, a picture of what resources are available, as well as the state of those resources may be compiled.

At 710, resources are allocated amongst the constituent devices based on the device status information. For example, a resource allocation may designate power and WWAN connectivity is to be provided by a first constituent device for use by a second constituent device.

At 712, resource sharing begins per the resource allocation. Thus, continuing the example, the first constituent device may turn off its onboard WWAN interface, and use the second constituent device's WWAN interface via the composite connection to retain connectivity.

Figure 8:
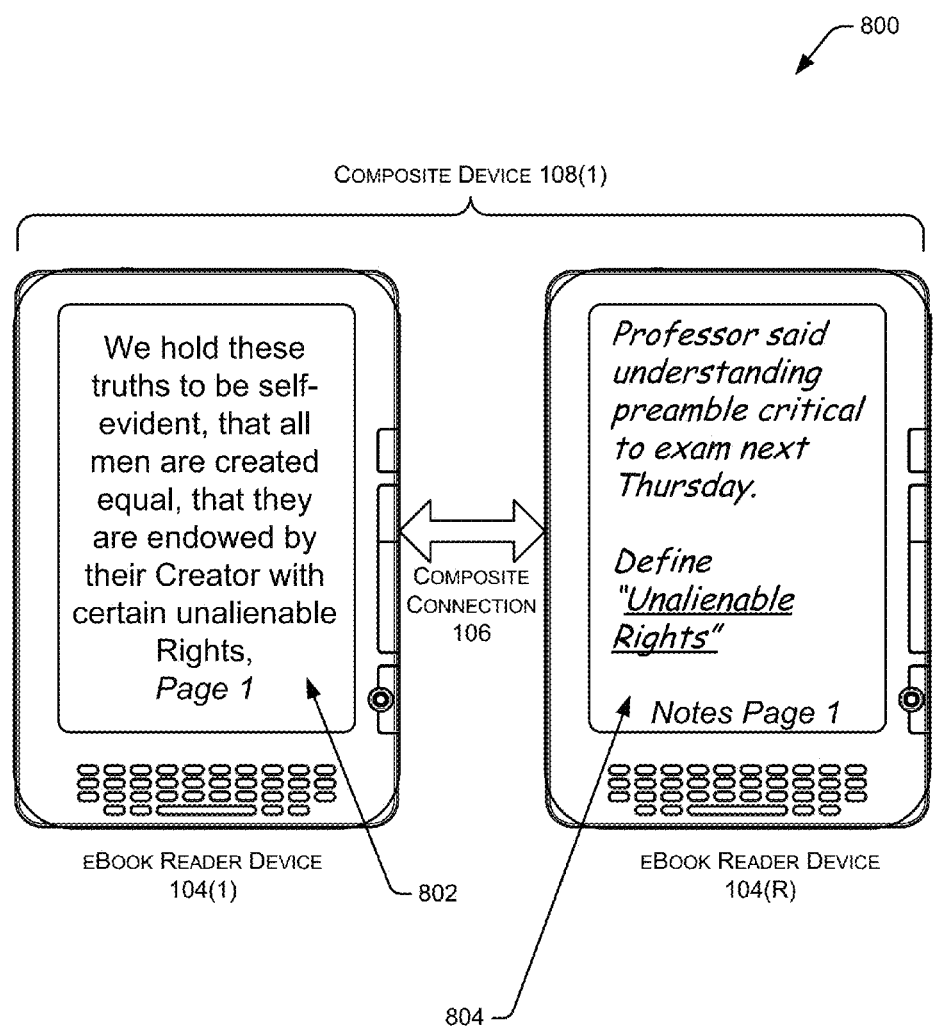
FIG. 8 is an illustration of a composite device presenting a page on a first eBook reader device and notes associated with that page on a second eBook reader device.

FIG. 8 is an illustration of a composite device 800 presenting a page on a first eBook reader device and notes associated with that page on a second eBook reader device. The composite device allows the sharing of resources across the constituent devices. These resources include presentation components such as a display, audio output, and so forth. In this illustration, composite device 108(1) is configured to display a page 802 of an eBook on the first eBook reader device 104(1), while a second eBook reader device 104(R) displays notes associated with that page.

Because the composite communication 106 provides communication between the constituent eBook reader devices, changes on one device may affect one or more of the other devices. For example, a user may change to a second page of the document on the first eBook reader devices 104(1), and the notes associated with that second page may be presented on the second eBook reader device 104(R). Similarly, changing which of multiple pages of notes are displayed may alter the display on the other device to show the associated text.

Figure 9:
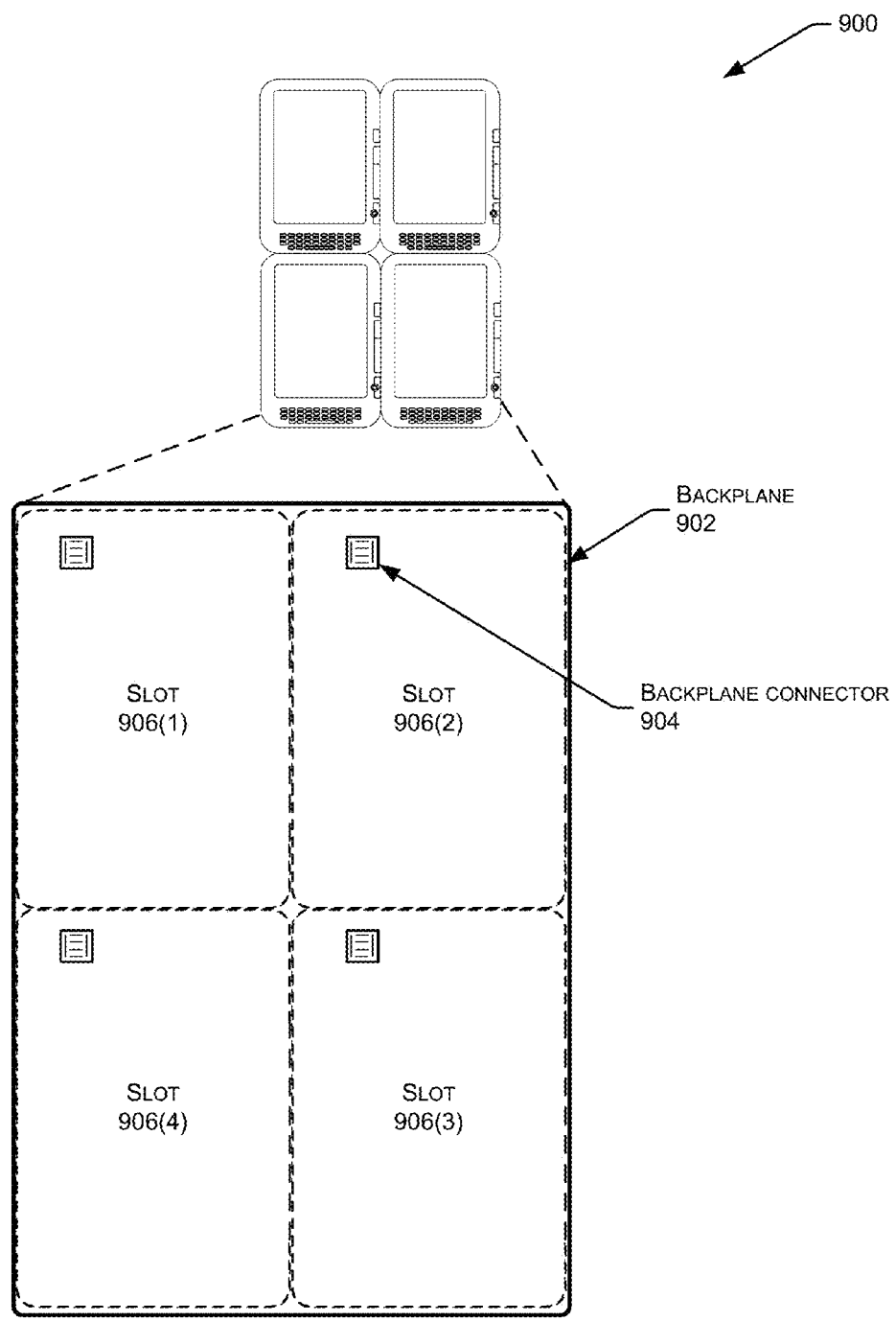
FIG. 9 is an illustration of a backplane to connect individual eBook reader devices into a composite device.

FIG. 9 is an illustration of an example backplane 900 to combine individual eBook reader devices into a composite device. A backplane 902 is configured to accept a plurality of constituent devices. This backplane 902 may be rigid, semi-rigid, flexible, or a combination thereof. The backplane 902 may include backplane connectors 904 configured to couple the backplane 904 to constituent devices. These connectors 904 may provide mechanical coupling, data connectivity, electrical power, and so forth. In one implementation, backplane 902 may comprise a cover for an eBook reader device configured to facilitate a composite connection between two eBook reader devices.

Because a composite device comprises a plurality of constituent devices, it may be advantageous to determine a spatial arrangement of the constituent devices. For example, when displaying text across several displays, users may prefer to have the pages displayed in order, such as arranged left to right.

Backplane 902 provides a mechanism for determining a spatial arrangement of multiple constituent devices of a composite device. Given that backplane 902 provides a relatively fixed reference structure, placement of the constituent device on a particular backplane connector 904 may thus indicate the spatial arrangement of the constituent devices to one another. Thus, a constituent device coupled to slot 906(1) is recognized as being directly above a constituent device coupled to slot 906(4), and directly to the left of a constituent device coupled to slot 906(2).

In some implementations the backplane 902 may provide resources. For example, backplane 902 may include a power supply, battery, network connectivity, memory, and so forth.

Figure 10:
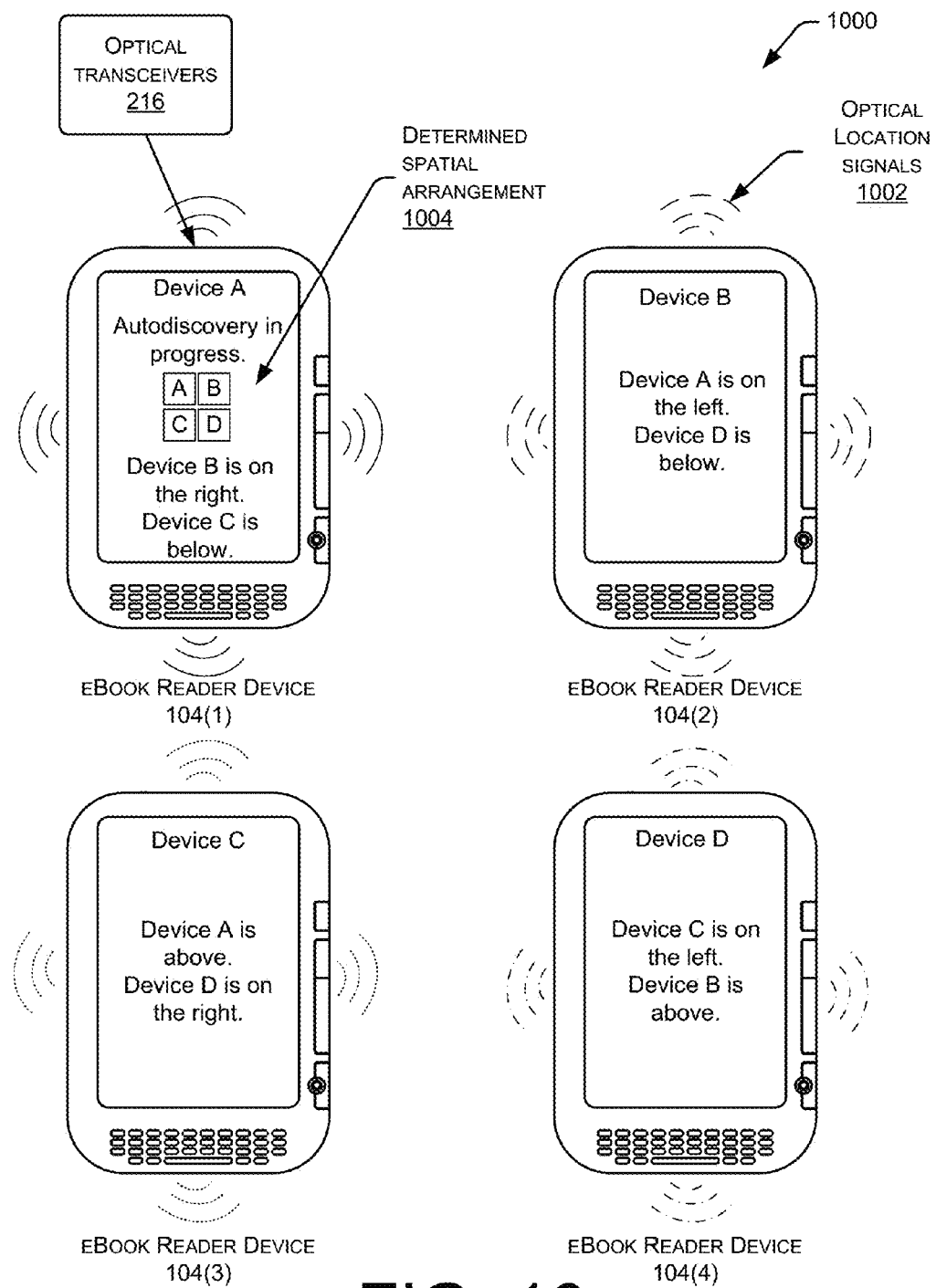
FIG. 10 is an illustration of eBook reader devices in a composite device determining their relative spatial arrangement using optical transceivers.

FIG. 10 is an illustration of eBook reader devices in a composite device determining their relative spatial arrangement 1000 using optical transceivers 216. As described above, information about the relative spatial arrangement of constituent devices within a composite device may be used to distribute information for presentation. For example, text may be distributed to flow left to right across the displays of the constituent devices. Or, audio may be distributed across multiple devices to provide surround-sound.

Constituent devices that have not been attached to the backplane 902, as shown in FIG. 9, may determine their relative spatial arrangement using optical location signals 1002. Optical transceivers 216 may be configured on constituent devices such that they may determine adjacent devices that are similarly equipped.

As shown in FIG. 10, optical signals 1002 are emitted from each of the sides of the constituent devices by optical transceivers 216. A spatial arrangement may be discovered by analyzing what constituent device signals are detected by a particular optical transceiver 216. Thus, as shown here eBook reader device 104(1) detects optical location signals 1002 indicating eBook reader device 104(2) is located to the right, while eBook reader device 104(3) is immediately below.

In some implementations, the optical transceivers 216 may be used to provide the composite connection as well. Also, in other implementations, other electromagnetic signals may be used.

The spatial arrangement of constituent devices in a composite device may be determined in one, two, or three dimensions. For example, constituent devices may be distributed along a line, a plane, or across a volume such as in a room.

Figure 11A:
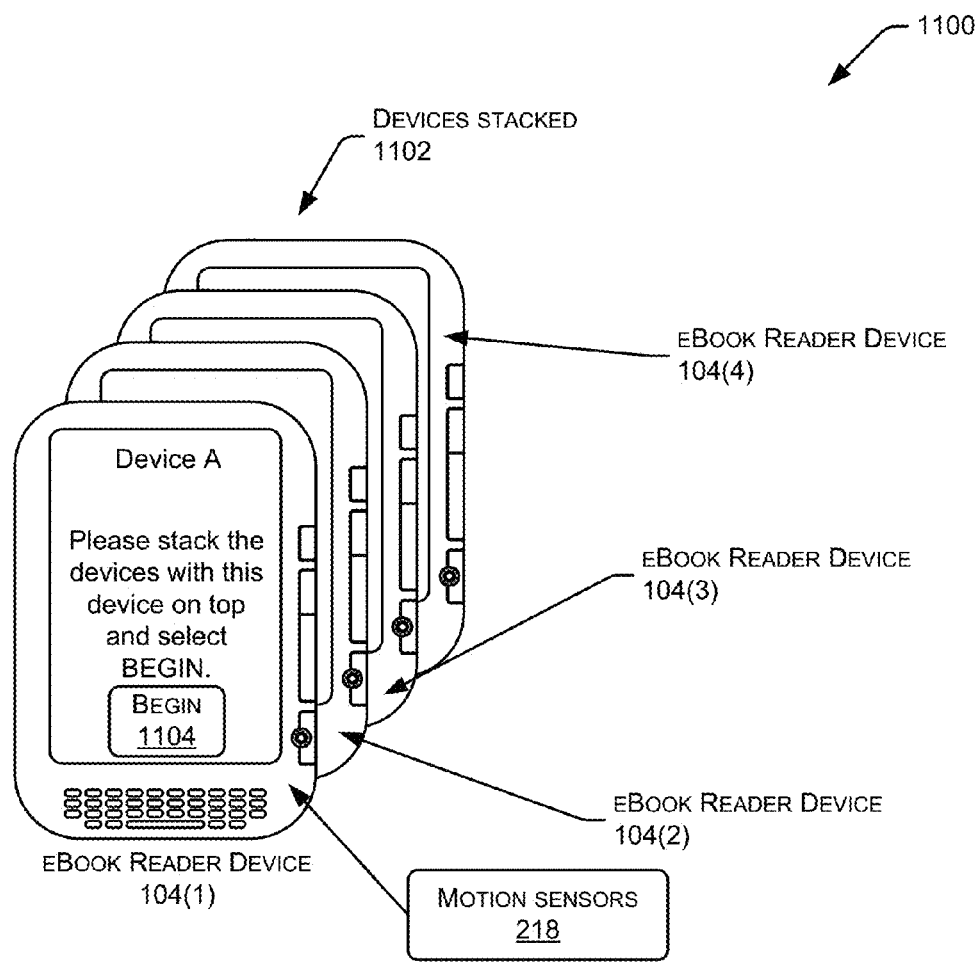
FIGS. 11A-11B illustrate eBook reader devices in a composite device determining their relative spatial arrangement using internal accelerometers.
Figure 11B:
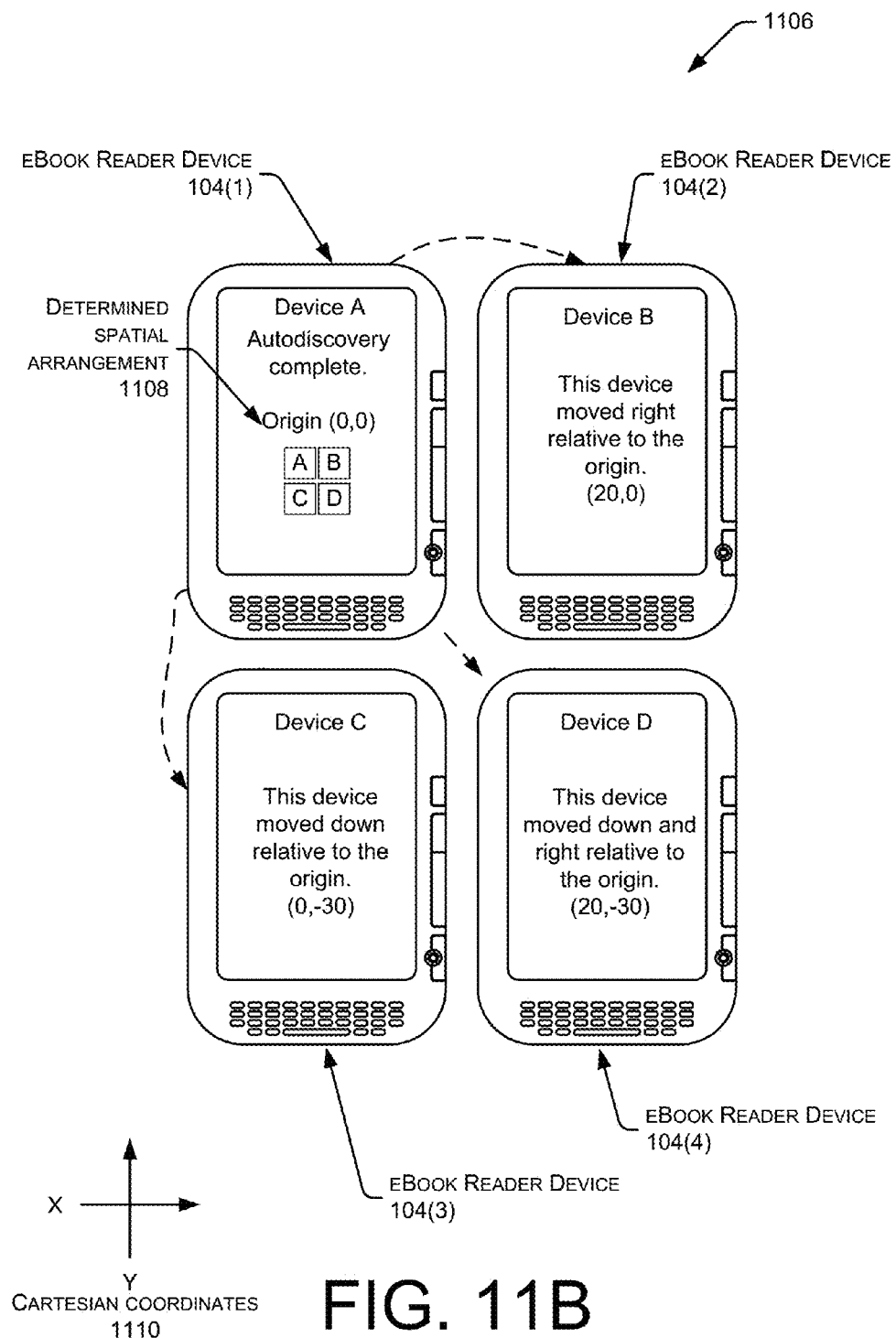

FIGS. 11A and 11B illustrate constituent devices in a composite device determining their relative spatial arrangement 1100 using internal motion sensors. Constituent devices may contain motion sensors 218, as discussed above with reference to FIG. 2. These motion sensors 218 may include linear accelerometers, rotational accelerometers, gyroscopes, laser gyroscopes, quartz rate sensors, pendular accelerometer, and so forth. These motion sensing devices provide information about their relative movement in space. When coupled to the electronic device 100, motion of the electronic device 100 in space may be determined. These motions may be linear, angular, or a combination of the two.

Information from motion sensors 218 may be used to determine a relative spatial arrangement of the constituent devices. As shown in FIG. 11A at 1100, four constituent devices are stacked atop one another 1102, or otherwise placed proximate to one another at an origin point. A user may be prompted at 1104 to begin determining the spatial arrangement.

Continuing to FIG. 11B, at 1106 the determining of the spatial arrangement has been initiated, and the user has moved the constituent devices into an approximately rectangular pattern. By integrating motion information generated by motion sensors 218 in the constituent devices, the relative spatial arrangement may be determined 1108 as an offset from the common origin point. In some implementations, this offset may be expressed as Cartesian coordinates, such as between orthogonal x and y axis. For example, eBook reader device 104(4) moved to the right and down relative to the origin, and thus shows a relative displacement of +20 centimeters along the x axis and −30 centimeters along the y axis.

The determination of the relative spatial arrangement may commence, upon receiving a user input, after a pre-determined amount of time, when all constituent devices are motionless, and so forth.

Figure 12:
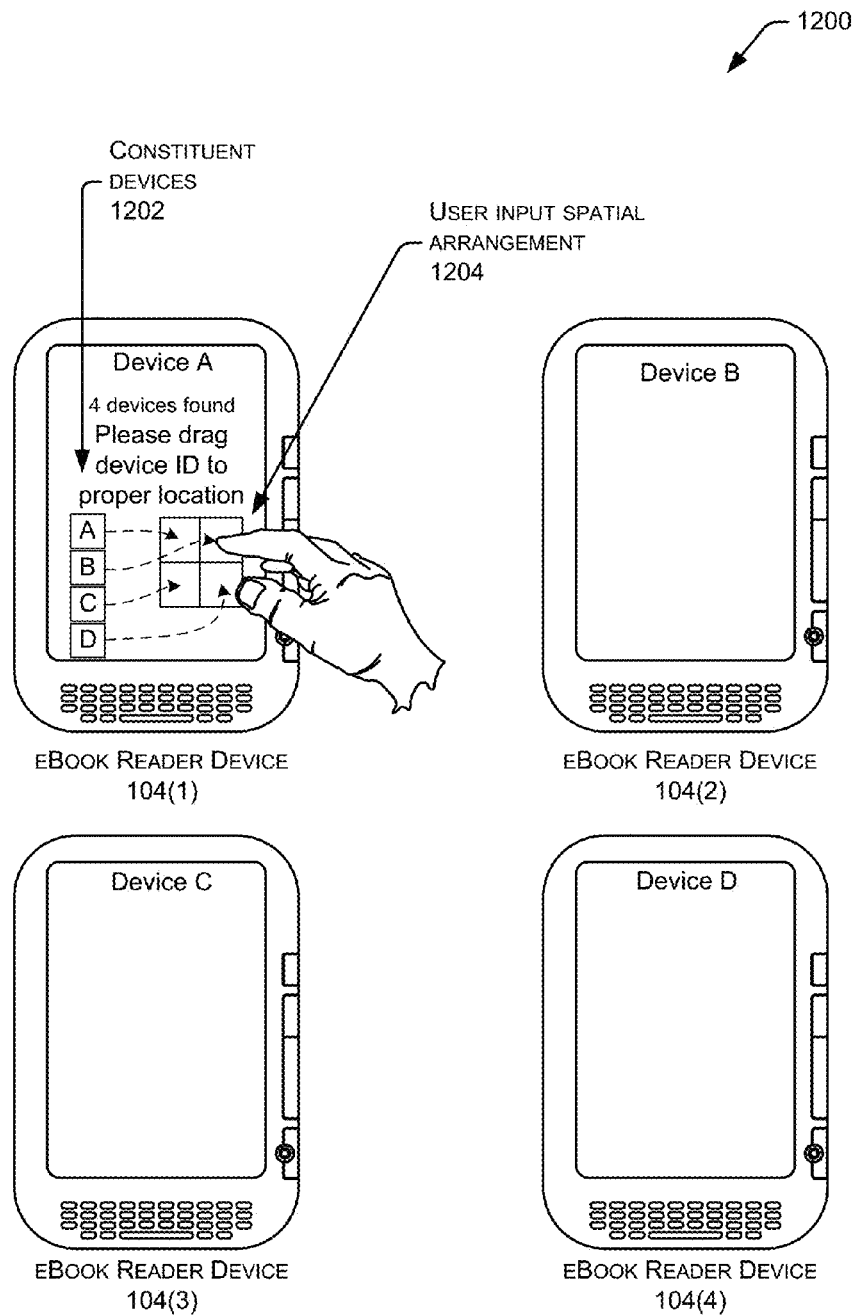
FIG. 12 is an illustration of manually inputting a relative spatial arrangement of eBook reader devices in a composite device.

FIG. 12 is an illustration of manually inputting a relative spatial arrangement 1200 of constituent devices in a composite device. In some implementations users may manually indicate the spatial arrangement of composite devices. As shown here, a user has been presented with a list 1202 of the four constituent devices that are proximate to one another. Here, the user has manually input the spatial arrangement using a touchscreen, as shown, or using other user actuable controls to input this information. In some implementations, the user input may be received audibly via a speech recognition module.

In some implementations multiple users may participate in the manual determination of spatial arrangement. For example, in a classroom setting where each student has a constituent device, each student may select who and where their neighbors are. This information may then be combined to provide a spatial arrangement of the constituent devices within a composite device.

Figure 13A:
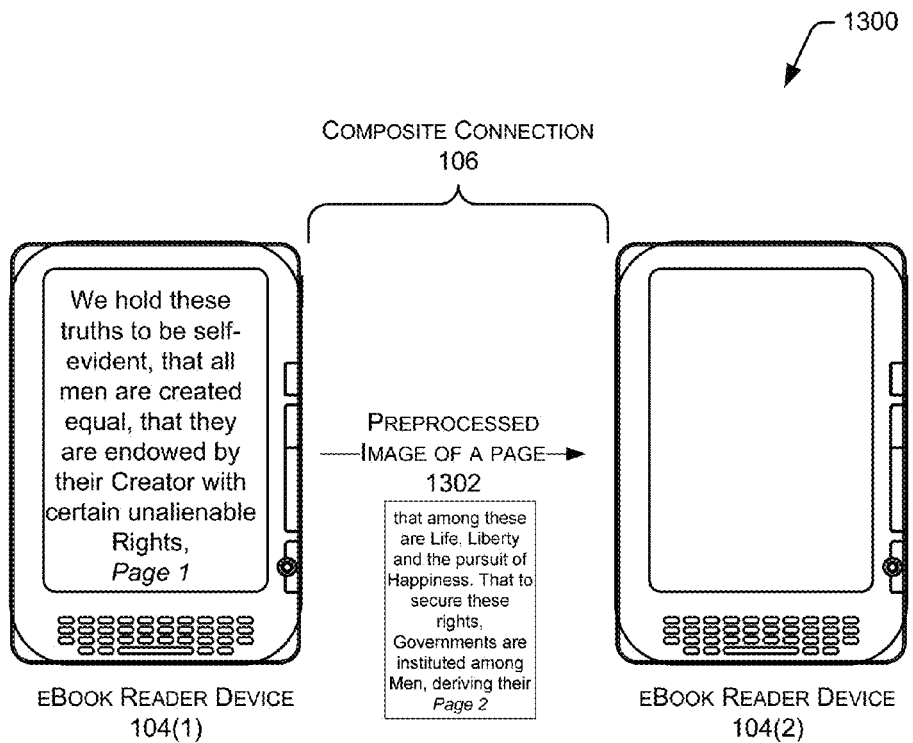
FIGS. 13A-13B illustrate transfer of a preprocessed image from one eBook reader device to another in a composite device.
Figure 13B:
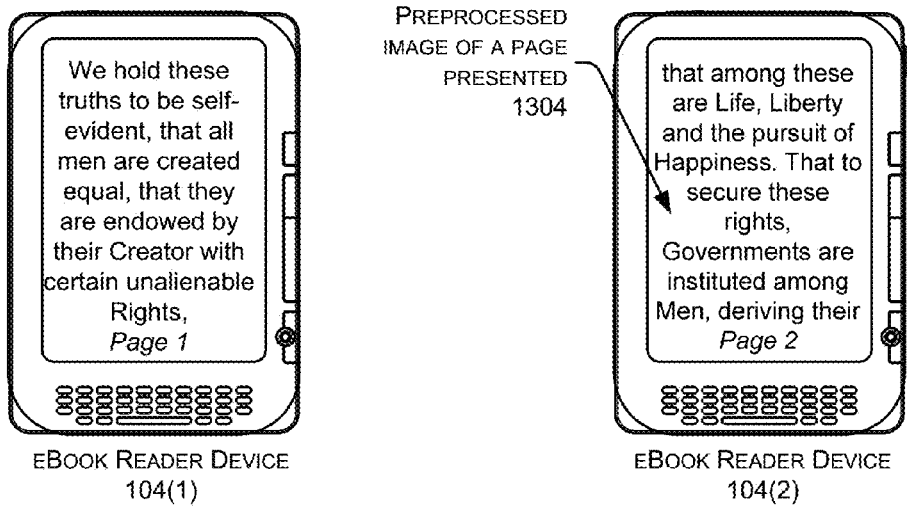

FIGS. 13A and 13B illustrate transfer 1300 of a preprocessed image from one eBook reader to another in a composite device. Presentation of content across the composite device may be accomplished in several ways. At least a portion of content may be packaged for presentation across constituent devices that are presenting data. For example, a chapter of an eBook accessible on one constituent device may be distributed across several eBook reader devices which are displaying different pages of the chapter. The page or pages to be displayed may be determined, at least in part, on the spatial arrangement of the constituent devices. Or, where one or more constituent devices contain a local copy of the content, invariant page references or other data indicating which portion of the content to be displayed may be transferred via the composite connection.

Content to be presented may be preprocessed before sending, as shown in FIGS. 13A and 13B. The eBook reader device 104(1) may have a copy of content to be displayed across the multiple displays of the composite device. As shown in FIG. 13A, the first eBook reader device 104(1) may determine the display parameters for the second eBook reader device 104(2) and may preprocess a page for display on the second device. Display parameters used in this determination may be obtained from the device status information. This preprocessed page may either be an extract of content, a bitmapped image, and so forth.

At 1302, the preprocessed page is packaged and transferred via the composite connection to the second device. Thus, each constituent device may receive a page designated for that particular constituent device to display. This designation is based, at least in part, on the spatial arrangement of the constituent devices. By sending each constituent device a particular package containing the specific content for that constituent device to display, data transfer between constituent devices may be minimized.

However, in some implementations the content to be presented across the composite device may be preprocessed and placed into a single package. For example, where three pages are to be displayed across a composite device having three constituent devices, a package including all three pages may be sent to each of the devices. Each constituent device then presents a portion of the entire package. Selection of the portion to be presented may be based at least in part on the spatial arrangement of the constituent devices. Thus, the constituent device on the left shows the left-most portion of the package, while the constituent device on the right shows the right-most portion of the package, and so forth. This single package may be provided to the constituent devices through individual data transfers, broadcast, and so forth.

FIG. 13B shows the second device displaying the preprocessed image of the page at 1304. By preprocessing the page, the first constituent device need not distribute a significant portion of the content to another device. This may be useful, for example, where content licensing agreements limit distribution of the content.

Figure 14:
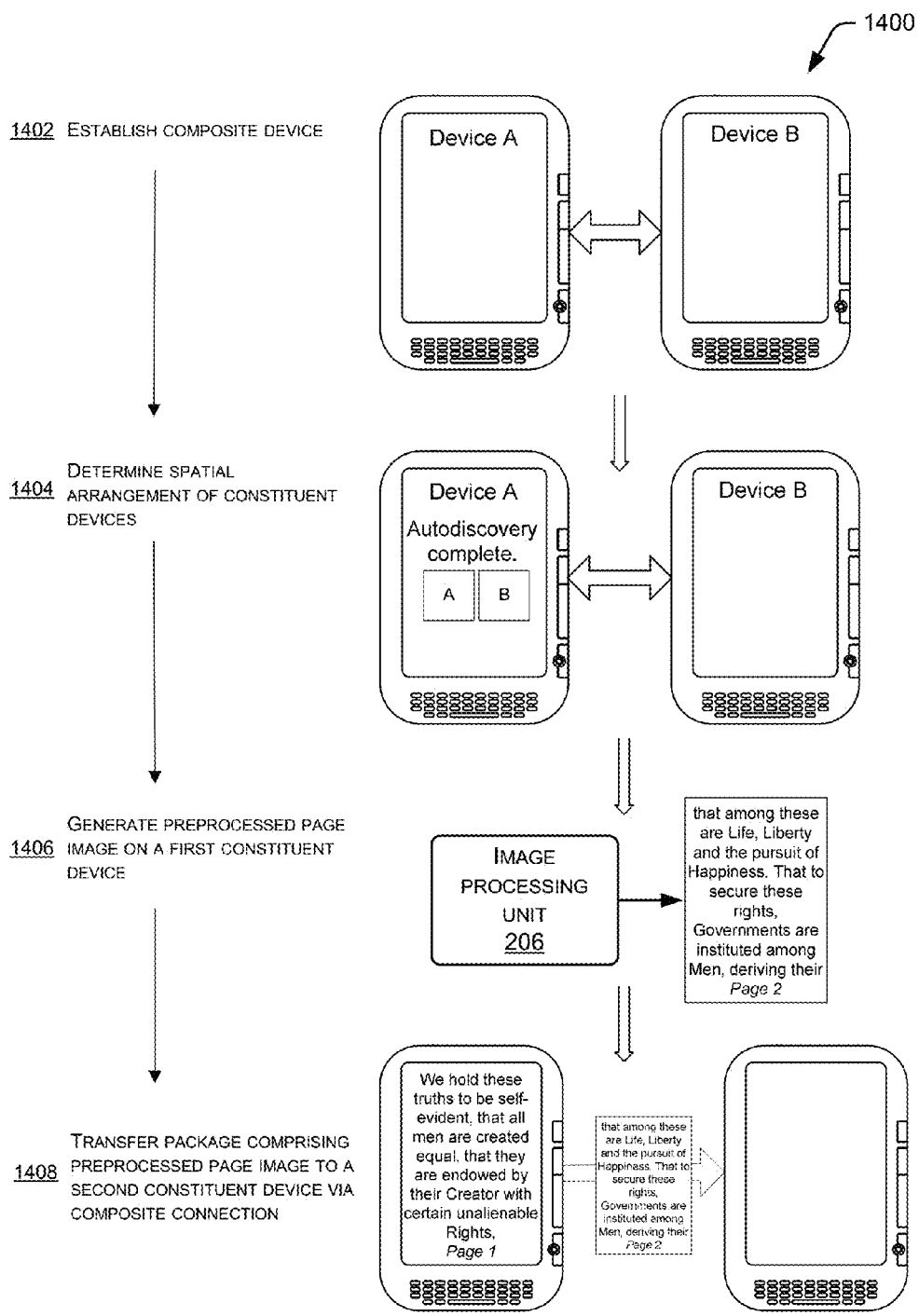
FIG. 14 is an illustrative process of preprocessing a page image and transferring the preprocessed page image from one eBook reader device to another.

FIG. 14 is an illustrative process 1400 of preprocessing a page image and transferring the image from one eBook reader device to another. As described above, it may be advantageous to preprocess and package content before transferring to constituent devices for presentation. Operation 1402 shows the establishment of the composite device. Operation 1404 determines the spatial arrangement of the constituent devices, in this case a first constituent device on the left and a second constituent device on the right. In this illustration, assume the first constituent device stores a local copy of content, such as an eBook, for presentation on the composite device. Operation 1406 on the first constituent device generates a preprocessed image on its image processing unit 206. This preprocessed image may be configured to fit the display on the second constituent device.

Operation 1408 shows the transfer of a package including the preprocessed page image to the second constituent device via the composite connection. As described above, the second constituent device may then display the package. Thus, the content may be displayed on all or a portion of the constituent devices.

FIG. 15 is an illustrative flow diagram 1500 of a process of configuring display resources across a composite device. At 1502, one or more composite management modules 102 establish a composite device comprising a plurality of constituent devices. At 1504, the composite management module 102 may determine a relative spatial arrangement of the constituent devices. At 1506, the composite management module 102 configures the content for display across one or more of the constituent devices.

At 1508, the composite management module 102 packages data on a first constituent device for display on other constituent devices. As described earlier, this packaged data may comprise a preprocessed image of a page 1508(1), an extract of page data for display 1508(2), an invariant reference number for synchronizing display 1508(3), and so forth.

At 1510, the composite management module 102 transfers the packaged data from the first device to the other constituent devices via the composite connection 106. The transfer destination of packaged data may be determined at least in part by the spatial arrangement of the constituent devices. Thus, where several constituent devices are arranged in a row, the first page may be packaged for display on the first constituent device, second page may packaged for display on the second constituent device, and so forth.

At 1512, the constituent devices have received the packaged data, and may begin presentation. For example, the constituent devices may display text from an eBook across the composite device. Individual presentation capabilities have been combined to display content in a way not possible to a single device.

FIG. 16 is an illustrative flow diagram of a process 1600 of determining a spatial arrangement of constituent devices within a composite device. This spatial arrangement may be used at least in part to determine which content or portion thereof to present on a given constituent device. At 1602, the composite management module 102 determines when automatic determination of spatial arrangement is available. When "yes," at 1604 the composite management module 102 checks to determine if a backplane is present. When the backplane is present, at 1606, the relative spatial arrangement of the constituent devices is determined by the location of constituent devices on the backplane.

When no backplane is present at 1604, information about relative spatial location of the constituent devices may be received at 1608. For example, in one implementation, at 1608(1) the optical transceivers may be used to interrogate proximate constituent devices, as described above with regards to FIG. 10. In another implementation, at 1608(2) motion sensor data may be used to report the relative motions of each constituent device, as described above with regards to FIGS. 11A-11B.

Once the spatial information has been gathered, the composite management module 102 may then determine a relative spatial arrangement based on the relative spatial location information at 1610. This spatial information may be provided relative to other constituent devices or absolutely in terms of location. The spatial information may also be provided with varying degrees of granularity. For example, spatial information may indicate "device B is to the left of device A", or that "device B is +30 centimeters along an x-axis from device A," or that "device B is located at West 48.938508102, North −119.434903201."

Returning to 1602, when automatic determination is unavailable, the composite management module 102 determines a unique identifier for each constituent device at 1612. This may be pre-determined, user selectable, and so forth. For example, in a classroom situation each user may have a unique identifier comprising their name.

At 1614, the composite management module 102 may then present a user interface showing constituent devices and permitting designation by a user of the relative spatial arrangement. For example, as shown above with respect to FIG. 12, a user may drag and drop each of the constituent devices into their relative spatial arrangement. At 1616 the user input is accepted, and content, or portions thereof, may be distributed across the constituent devices according to the relative spatial arrangement.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A portable device comprising:
   one or more processors;
   a memory coupled to the one or more processors; and
   a one or more modules stored in the memory and executable on the one or more processors to:
   establish a composite device comprising the portable device and at least one other device attached to a backplane, wherein the backplane is a device separate from the portable device and the at least one other device and the backplane comprises multiple connection points;
   determine a spatial arrangement of the portable device and the at least one other device based at least in part on a first connection point on the backplane for the portable device and at least one other connection point for the at least one other device; and
   provide information to the at least one other device for presentation on the at least one other device based at least in part on the spatial arrangement between the portable device and the at least one other device.

2. The portable device of claim 1, wherein the one or more modules are further executable on the one or more processors to present at least a portion of a first content object while the at least one other device uses the provided information to present at least a portion of a second content object associated with the first content object.

3. The portable device of claim 1, wherein the provided information comprises at least one of text, audio, or video, and wherein the information includes an invariant reference number to synchronize presentation of the information on the at least one other device with the portable device.

4. The portable device of claim 1, wherein the portable device is embodied as an electronic book reader device.

5. The portable device of claim 1, wherein the one or more modules are further executable on the one or more processors to establish communication between the portable device and the at least one other device through at least one of:
   a wireless connection;
   a wired connection; or
   an optical connection.

6. The portable device of claim 1, wherein the backplane comprises a cover for the portable device.

7. The portable device of claim 1, wherein the one or more modules are further executable on the one or more processors to receive motion data relative to a common origin point from one or more sensors of the portable device.

8. The portable device of claim 1, wherein the one or more modules are further executable on the one or more processors to determine the spatial arrangement of the portable device and the at least one other device based at least in part from an interchange of electromagnetic signals between the portable device and the at least one other device.

9. The portable device of claim 1, wherein the at least one other device includes one or more of an accelerometer, a gyroscope, or a quartz rate sensor.

10. The portable device of claim 1, wherein the one or more modules are further executable on the one or more processors to receive a user input specifying the spatial arrangement of the portable device and the at least one other device, wherein the spatial arrangement is determined based at least in part on the user input.

11. The portable device of claim 1, wherein the one or more modules are further executable on the one or more processors to:
   pre-process an image for presentation; and
   transfer, based at least in part on the spatial arrangement of the portable device and the at least one other device, the pre-processed image from the portable device to the at least one other device for presentation.

12. One or more non-transitory computer-readable storage media storing instructions that, when executed by one or more processors, cause the one or more processors to perform acts comprising:
   establishing a composite device comprising multiple constituent computing devices, individual ones of the constituent computing devices configured to attach to a backplane, wherein the backplane is a device separate from the constituent computing devices and the backplane comprises multiple connection points;

determining, for each of the constituent computing devices, a connection point of the multiple connection points on the backplane to which a respective constituent computing device attaches;

determining a spatial arrangement of the constituent computing devices based at least in part on the connection point on the backplane for each of the constituent computing devices;

determining, on a first constituent computing device of the multiple constituent computing devices, data for presentation on a second constituent computing device of the multiple constituent computing devices based at least in part on the spatial arrangement of the constituent computing devices; and sending the data to the second constituent computing device for presentation.

13. The one or more non-transitory computer-readable media of claim 12, the sending further comprising sending the data from the first constituent computing device to the second computing device via a local or a personal area network.

14. The one or more non-transitory computer-readable media of claim 12, the sending further comprising sending an instruction to cause presentation of the data on the second constituent computing device.

15. The one or more non-transitory computer-readable media of claim 12, wherein the data comprises an invariant reference number to synchronize presentation of the data on the second constituent computing device.

16. The one or more non-transitory computer-readable media of claim 12, wherein:

the data comprises data for presentation on the second constituent computing device and at least one other constituent computing device; and the determining the data for presentation on the second constituent computing device further comprises determining the data based at least in part on the spatial arrangement of the second constituent computing device and the at least one other constituent computing device of the multiple constituent computing devices.

17. The one or more non-transitory computer-readable media of claim 12, further comprising:

exchanging electromagnetic signals between at least one of the first constituent computing device or the second constituent computing device and a third constituent computing device of the multiple constituent computing devices; and determining the spatial arrangement of the multiple constituent computing devices based at least in part on the exchanged electromagnetic signals.

18. The one or more non-transitory computer-readable media of claim 12, further comprising:

receiving by at least one of the first constituent computing device or the second constituent computing device, motion information from a third constituent computing device of the multiple constituent computing devices, the motion information indicating movement of the third constituent computing device from a common origin point; and determining the spatial arrangement of the multiple constituent computing devices based at least in part on the motion information.

19. The one or more non-transitory computer-readable media of claim 12, further comprising:

presenting a user interface displaying representations of the multiple constituent computing devices; and receiving user input via the user interface; and determining the spatial arrangement based at least in part on the user input.

20. A method comprising:

creating a composite device comprising multiple constituent computing devices, individual ones of the constituent computing devices configured to attach to a backplane, wherein the backplane is a device separate from the constituent computing devices and the backplane comprises multiple connection points, the constituent computing devices comprising at least a first computing device and a second computing device;

determining, for each of the constituent computing devices, a connection point of the multiple connection points on the backplane to which a respective constituent computing device attaches;

determining a spatial arrangement of the second computing device relative to the first computing device based at least in part on the connection point on the backplane for each of the constituent computing devices;

determining, based at least in part on the spatial arrangement, a portion of content on the first computing device for presentation on the second computing device; and sending the portion of content from the first computing device to the second computing device.

21. The method of claim 20, further comprising sending an instruction from the first computing device to the second computing device, the instruction to cause presentation of the portion of content on the second computing device, the portion of content including an invariant reference number to synchronize, with the first computing device, presentation of the content on the second computing device.

22. The method of claim 20, further comprising:

receiving, by the first computing device, electromagnetic signals from the second computing device; and determining the spatial arrangement based at least in part on the electromagnetic signals.

23. The method of claim 20, further comprising:

receiving user input associated with the spatial arrangement of the first computing device and the second computing device; and determining the spatial arrangement based at least in part on the user input.

24. The method of claim 20, wherein the determining the spatial arrangement further comprises determining the spatial arrangement based at least in part on a linear offset from a common origin point.

25. The method of claim 20, wherein the constituent computing devices communicate with each other using at least one of:

a wireless connection;

a wired connection; or an optical connection.

* * * * *